US011431092B1

(12) United States Patent
Jacquet et al.

(10) Patent No.: US 11,431,092 B1
(45) Date of Patent: Aug. 30, 2022

(54) NEAR ZERO INTERMEDIATE FREQUENCY (NZIF) COMPENSATION OF LOCAL OSCILLATOR LEAKAGE

(71) Applicant: Space Exploration Technologies Corp., Hawthorne, CA (US)

(72) Inventors: David Francois Jacquet, Vaulnaveys le Haut (FR); Marc Gens, Saint Martin d'Uriage (FR); Paul Lee Pearson, Biviers (FR); Pascal Triaire, Jarrie (FR)

(73) Assignee: Space Exploration Technologies Corp., Hawthorne, CA (US)

(*) Notice: Subject to any disclaimer, the term of this patent is extended or adjusted under 35 U.S.C. 154(b) by 79 days.

(21) Appl. No.: 15/931,531

(22) Filed: May 13, 2020

Related U.S. Application Data

(60) Provisional application No. 62/847,873, filed on May 14, 2019.

(51) Int. Cl.
*H04B 1/00* (2006.01)
*H01Q 3/26* (2006.01)
(Continued)

(52) U.S. Cl.
CPC .............. *H01Q 3/2617* (2013.01); *H01Q 3/38* (2013.01); *H01Q 3/42* (2013.01); *H04B 1/0082* (2013.01); *H04B 17/12* (2015.01); *H04B 17/19* (2015.01)

(58) Field of Classification Search
CPC ........ H01Q 3/34; H01Q 3/2611; H04B 17/12; H04B 17/19; H04B 1/0082
See application file for complete search history.

(56) References Cited

U.S. PATENT DOCUMENTS

| | | | |
|---|---|---|---|
| 7,079,596 B1* | 7/2006 | Namura | H04B 1/0082 375/324 |
| 7,733,991 B2* | 6/2010 | Ryter | H04L 27/142 375/343 |

(Continued)

OTHER PUBLICATIONS

International Search Report and Written Opinion dated Aug. 24, 2020, issued in corresponding International Application No. PCT/US2020/032751, filed May 13, 2020, 12 pages.

(Continued)

*Primary Examiner* — Nhan T Le
(74) *Attorney, Agent, or Firm* — Polsinelli PC

(57) ABSTRACT

In an embodiment, a communications system includes a transmitter including a digital beamforming baseband section including a digital mixer, the digital beamforming section configured to receive an input signal to be transmitted, the input signal at a baseband frequency; and a modulation section electrically coupled to the digital beamforming baseband section, the modulation section including an up converter configured to receive a local oscillator signal at a local oscillator frequency. The digital mixer is configured to apply a baseband frequency shift to the input signal to generate a baseband frequency shifted input signal at a different frequency from the baseband frequency. The up converter is configured to up convert the baseband frequency shifted input signal based on the local oscillator signal to generate a modulated signal at a carrier frequency, wherein the local oscillator frequency is different from the carrier frequency.

14 Claims, 16 Drawing Sheets

(51) Int. Cl.
*H01Q 3/42* (2006.01)
*H01Q 3/38* (2006.01)
*H04B 17/19* (2015.01)
*H04B 17/12* (2015.01)

(56) References Cited

U.S. PATENT DOCUMENTS

| | | | |
|---|---|---|---|
| 8,045,926 | B2 | 10/2011 | Martikkala |
| 8,175,538 | B1 | 5/2012 | Chen |
| 9,118,111 | B2 | 8/2015 | Naguib |
| 9,673,916 | B2 | 6/2017 | Mow |
| 10,484,106 | B2 | 11/2019 | Garcia |
| 2004/0048584 | A1 | 3/2004 | Vaidyanathan et al. |
| 2004/0229592 | A1* | 11/2004 | Matsui .................. H04B 1/005 455/333 |
| 2005/0281318 | A1* | 12/2005 | Neugebauer ......... H04B 1/7075 375/134 |
| 2006/0058022 | A1 | 3/2006 | Webster et al. |
| 2010/0093282 | A1 | 4/2010 | Martikkala et al. |
| 2010/0142590 | A1 | 6/2010 | Höhne et al. |
| 2014/0364132 | A1* | 12/2014 | Rey ........................ H04L 27/12 455/450 |
| 2015/0139046 | A1 | 5/2015 | Wang et al. |
| 2017/0005408 | A1* | 1/2017 | Gomadam ............... H01Q 3/28 |
| 2017/0324486 | A1 | 11/2017 | Garcia et al. |
| 2018/0219637 | A1 | 8/2018 | Mow et al. |

OTHER PUBLICATIONS

U.S. Appl. No. 15/931,443 non-final Office Action dated Feb. 19, 2021, 14 pages.

Ashok Agrawal et al., "A Calibration Technique for Active Phased Array Antennas", John Hopkins University Applied Physics Laboratory, p. 223-228, IEEE, © 2003.

* cited by examiner

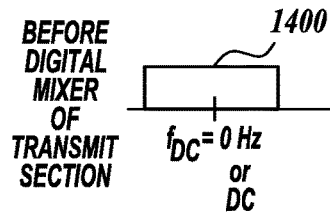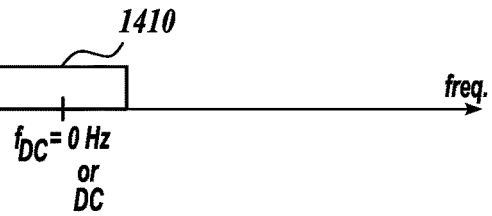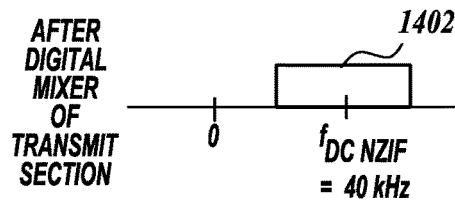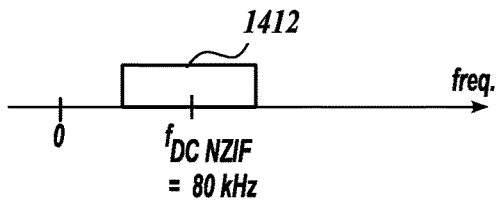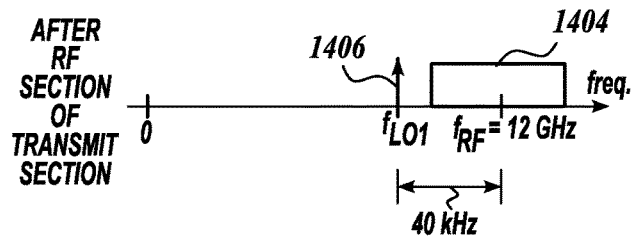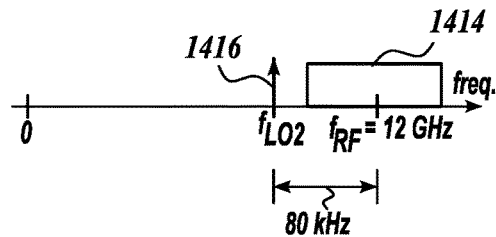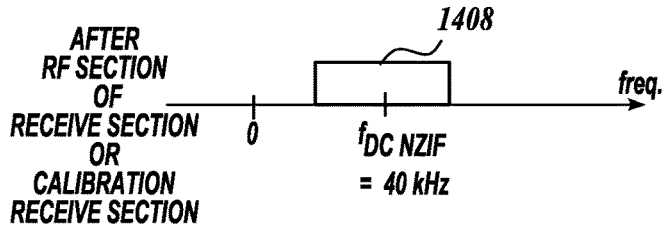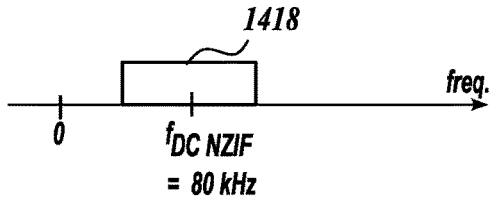
FIG. 14

US 11,431,092 B1

NEAR ZERO INTERMEDIATE FREQUENCY (NZIF) COMPENSATION OF LOCAL OSCILLATOR LEAKAGE

CROSS-REFERENCE TO RELATED APPLICATION

The present application claims priority to U.S. Provisional Patent Application No. 62/847,873 filed May 14, 2019 entitled "Antenna Calibration," the contents of which is hereby incorporated by reference in its entirety.

BACKGROUND

An antenna (such as a dipole antenna) typically generates radiation in a pattern that has a preferred direction. For example, the generated radiation pattern is stronger in some directions and weaker in other directions. Likewise, when receiving electromagnetic signals, the antenna has the same preferred direction. Signal quality (e.g., signal to noise ratio or SNR), whether in transmitting or receiving scenarios, can be improved by aligning the preferred direction of the antenna with a direction of the target or source of the signal. However, it is often impractical to physically reorient the antenna with respect to the target or source of the signal. Additionally, the exact location of the source/target may not be known. To overcome some of the above shortcomings of the antenna, a phased array antenna can be formed from a set of antenna elements to behave as a large directional antenna. An advantage of a phased array antenna is its ability to transmit and/or receive signals in a preferred direction (e.g., the antenna's beamforming ability) without physical repositioning or reorientating.

It would be advantageous to configure phased array antennas having increased bandwidth while maintaining a high ratio of the main radiated lobe power to the side lobe power. Likewise, it would be advantageous to configure phased array antennas and associated circuitry having reduced weight, reduced size, lower manufacturing cost, and/or lower power requirements. It would be advantageous to maintain the phased array antennas and associated circuitry in a nominal or narrow operating range. Accordingly, embodiments of the present disclosure are directed to these and other improvements in phased array antennas or portions thereof.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 14 illustrates example signals showing various applicable frequencies with NZIF compensation technique in accordance with various aspects of the present disclosure.

DETAILED DESCRIPTION

Figure 1:
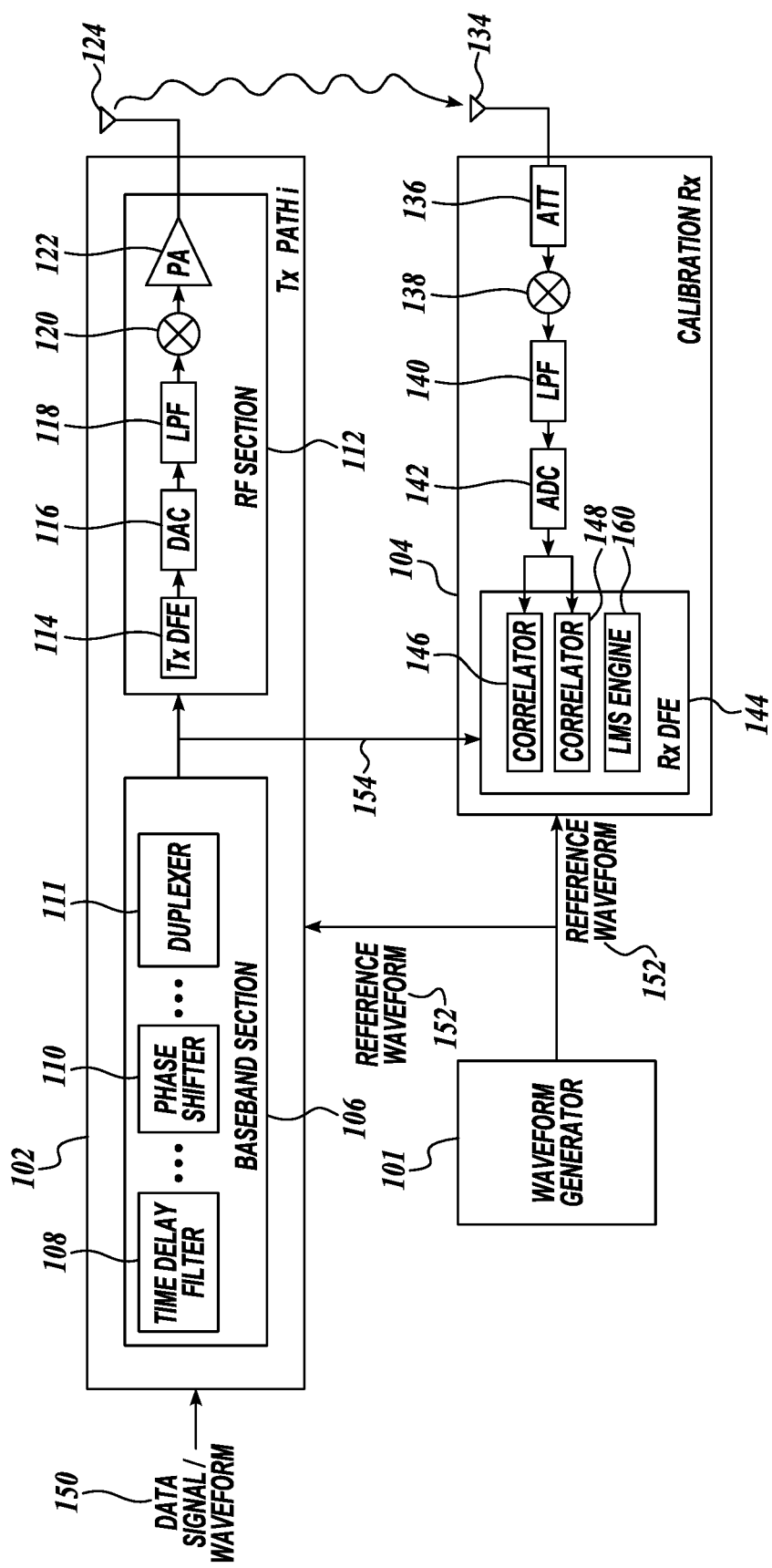
FIG. 1 is an example illustration of a block diagram showing over-the-air calibration components in connection with transmit section calibration in accordance with various aspects of the present disclosure.

Embodiments of apparatuses and methods relate to a near zero intermediate frequency (NZIF) compensation technique to reduce or spread local oscillator (LO) leakage signal radiative contribution in terms of spectrum content measured across a certain bandwidth in a transmission beam. In an embodiment, a communications system includes a transmitter including a digital beamforming baseband section including a digital mixer, the digital beamforming section configured to receive an input signal to be transmitted, the input signal at a baseband frequency; and a modulation section electrically coupled to the digital beamforming baseband section, the modulation section including an up converter configured to receive a local oscillator signal at a local oscillator frequency. The digital mixer is configured to apply a baseband frequency shift to the input signal to generate a baseband frequency shifted input signal at a different frequency from the baseband frequency. The up converter is configured to up convert the baseband frequency shifted input signal based on the local oscillator signal to generate a modulated signal at a carrier frequency, and wherein the local oscillator frequency is different from the carrier frequency. These and other aspects of the present disclosure will be more fully described below.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C); (A and B); (B and C); (A and C); or (A, B, and C).

Language such as "top surface," "bottom surface," "vertical," "horizontal," and "lateral" in the present disclosure is meant to provide orientation for the reader with reference to the drawings and is not intended to be the required orientation of the components or to impart orientation limitations into the claims.

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, it may not be included or may be combined with other features.

Many embodiments of the technology described herein may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like). Information handled by these computers can be presented at any suitable display medium, including an organic light emitting diode (OLED) display or liquid crystal display (LCD).

FIG. 1 is an example illustration of a block diagram showing over-the-air calibration components in connection with transmit section calibration in accordance with various aspects of the present disclosure. In some embodiments, actual time delay, phase, and amplitude of a reference signal transmitted by an antenna element included in a phased array antenna can be measured. This is accomplished by a receive antenna and a calibration receiver, and then the received signal is correlated with the reference signal. Based on the measured time delay, phase, and/or amplitude, the transmitter from which the reference signal was transmitted is compensated in order to improve the radiated performance of the phased array antenna (e.g., main beam direction and side lobe level). Phase accuracy achieved from the over-the-air calibration technique disclosed herein is in the range of a sub-picosecond at the actual operating radio frequency (RF) frequency.

Each antenna element of the phased array antenna and its associated transmission or receiver circuitry undergoes a similar calibration. Such measurements and calibration based on the measurements can be performed simultaneously with or independent of normal operation of the phased array antenna (e.g., during transmission and receiving of regular or normal signals in the phased array antenna). In some embodiments, signal-to-noise (SNR) conditions are taken into account in performance of over-the-air calibration by using clusterizaton.

In some embodiments, the configuration of FIG. 1 is associated with calibrating a transmit section 102 using a waveform generator 101 and a calibration receive section 104 in accordance with a calibration technique disclosed herein. The waveform generator 101 is electrically coupled to each of the transmit section 102 and the calibration receive section 104. Transmit section 102 comprises the signal processing components that configure data to be transmitted into a format where at least a portion of the data can be transmitted by an antenna element 124 to be recovered by a destination receivers. Calibration receive section 104 can also receive the signal transmitted through (transmit) antenna element 124 via (receive) antenna element 134. Antenna elements 124 and 134 are included in the same phased array antenna panel. In some embodiments, antenna element 134 can be configured to act as a receive antenna element for calibration receive section 104 during calibration and as another transmit antenna element, along with antenna element 124, in the phased array antenna when calibration is not being performed.

A plurality of transmit sections similar to transmit section 102 and associated antenna elements collectively transmit the data in its totality, in some embodiments. A signal processing pathway or path i is defined by the components of transmit section 102 and is associated with an ith antenna element. Transmit section 102 comprises the ith path for the ith antenna element 124.

Transmit section 102 includes, without limitation, a baseband processing section 106 and a radio frequency (RF) section 112. Baseband processing section 106, also referred to as a baseband section 106, is configured to encode or perform beamforming on data signal 150 to be transmitted. Data signal 150 to be transmitted is also referred to as a data waveform, a data stream, a data beam, data, and/or the like. Data signal 150 comprises a normal or regular signal that is to be transmitted during normal operation of the antenna element 124 and transmit section 102. Data signal 150 is provided by a modem. In the case of multi-beam operation, multiple data streams such as data signal 150 are received by baseband section 106 from one or more modems. Each data stream of the multiple data streams is time and phase encoded independently of each other and then combined before passing to RF section 112.

Time delay filter(s) 108 is configured to encode the data signal 150 with particular time delay(s), and the phase shifter(s) 110 is configured to encode the data signal 150 with particular phase(s). Transmit section 102 may also be referred to as a transmitter, transmitter section, and/or the like.

The time delay and phase encoded (digital) data signal, also referred to as a baseband signal, comprises the input to the RF section 112. The RF section 112 includes, without limitation, a transmit digital front end (Tx DFE) 114, a digital-to-analog converter (DAC) 116, a low pass filter (LPF) 118, a mixer 120, and a power amplifier (PA) 122. RF section 112 is also referred to as a modulation section. The Tx DFE 114 receives the time delay and phase encoded digital data signal. Tx DFE 114 is configured to be a bridge between the baseband processing in section 106 and the analog RF processing to be performed in the RF section 112. Tx DFE 114 may be responsible for one or more processing functions related to channelization, channel bonding, and/or sample rate conversion. Tx DFE 114 is configured to, among other things, resample the digital signal to a higher sample rate or density and provide the up sampled signal to the DAC 116.

DAC 116 is configured to convert the digital signal into an analog signal. DAC 116 may comprise an IQ DAC. The time delay and phase encoded digital data signal is now a time delay and phase encoded analog signal. The analog signal is the input to LPF 118.

LPF 118 is configured to low pass filter or de-noise the analog signal. The filtered analog signal is the input to mixer 2120. Mixer 120 is configured to perform frequency up conversion to convert the baseband frequency associated with the filtered analog signal to a carrier frequency (e.g., change from $f_{DC}$ to $f_{RF}$). Although not shown, a signal from a local oscillator is also an input to mixer 120 in order to perform the frequency up conversion. The time delayed and phase encoded analog signal provided on a carrier frequency, also referred to as a RF signal, is power amplified by the PA 122.

The amplified RF signal outputted by the PA 122 is the input to the antenna element 124. In turn, the antenna element 124 radiates the amplified RF signal. In some embodiments, PA 122 may comprise a pre-power amplifier (PPA) and another PA may be provided external to transmit section 102 between PA 122 and antenna element 124. In some embodiments, a bandpass filter may be electrically coupled between the PA 122 and antenna element 124.

A reference waveform 152 is generated by the waveform generator 101 and provided to transmit section 102. The reference waveform 152 comprises an orthogonal code based signal such as, but not limited to, a code division multiple access (CDMA) signal. Reference waveform 152 is also referred to as a reference signal, a calibration waveform, a calibration signal, a calibration reference signal, a calibration reference waveform, and/or the like.

In some embodiments, the reference waveform 152 is duplexed or combined with the time delay and phase encoded (digital) data signal (the data signal 150 processed by baseband section 106 and to be provided to the RF section 112) by a duplexer 111 included in the baseband section 106. Unlike the data signal 150, reference waveform 152 is not processed or encoded by baseband section 106. The combined signal comprises the input to RF section 112. RF section 112 processes the combined signal and outputs a combined RF signal that is transmitted or radiated by antenna element 124. When the transmitted combined RF signal is received by the calibration receive section 104, the received signal portion corresponding to the data signal 150 (the regular encoded signal) will be considered noise relative to the received signal portion corresponding to the reference waveform 152 (the non-encoded, known reference signal). Using the combined signal, calibration of antenna element 124 and/or transmit section 102 can be performed during normal operation of antenna element 124 and/or transmit section 102.

Alternatively, data signal 150 can be optional and the reference waveform 152 alone is transmitted by the antenna element 124. Reference waveform 152 bypasses processing in baseband section 106 (e.g., reference waveform 152 is not phase nor time delay encoded) and still undergoes processing in the RF section 112 (e.g., conversion to an analog signal, low pass filtered, up conversion, RF amplification, etc.). The resulting signal transmitted to calibration receive section 104 comprises a reference RF signal.

The amplified RF signal transmitted by antenna element 124 (the combined RF signal or the reference RF signal) is detected by an antenna element 134 electrically coupled with the calibration receive section 104. Antenna element 134 is also referred to as a calibration antenna element. While antenna element 124 comprises an antenna element that is used for normal or regular signal transmission as well as for calibration purposes as described herein, antenna element 134 comprises an antenna element dedicated for calibration purposes and/or an antenna element switchable between calibration or regular signal transmission purposes. Antenna elements 124 and 134 can be included in the same antenna lattice, as will be discussed in detail below.

Calibration receive section 104 includes, without limitation, a RF attenuator (Att) 136, a mixer 138, a low pass filter (LPF) 140, an analog-to-digital converter (ADC) 142, and a receive digital front end (Rx DFE) 144. RF attenuator 136 is configured to adjust the level of analog RF signal received at antenna element 134 and to maintain operation in linear mode, particularly for amplitude measurement. The attenuated RF signal is the input to the mixer 138. A signal generated by a local oscillator (not shown) is also an input to the mixer 138. Mixer 138, also referred to as a down converter, is configured to perform frequency down conversion to change the frequency associated with the attenuated RF signal from the RF carrier frequency to the baseband frequency (e.g., change from $f_{RF}$ to $f_{DC}$). Next, the signal is low pass filtered or de-noised by LPF 140. The filtered signal, which is an analog signal, is converted to a digital signal by ADC 142. ADC 142 may comprise an IQ ADC. The output of ADC 142 is the input to Rx DFE 144.

Calibration receive section 104 may also be referred to as a calibration receiver, an auxiliary receiver, a receiver, a receiver section, and/or the like.

Rx DFE 144 is configured to perform one or more processing functions relating to channelization and/or sample rate conversion. Rx DFE 144 is configured to, among other things, resample the inputted digital signal to a lower sample rate or density or otherwise provide the digitized signal into a format suitable for calibration-related determinations.

Rx DFE 144 includes, without limitation, correlators 146 and 148 and a least mean square (LMS) engine 160. Correlators 146, 148 are configured to calculate correlations between the signal received by antenna element 134 (e.g., the output of ADC 142) and a known signal from waveform generator 101 or baseband section 106. LMS engine 160 is configured to perform calculations to determine, based on the correlation determinations from correlators 146 and/or 148, the calibration to apply to calibrate transmit section 102.

In some embodiments, correlator 146, correlator 148, and/or LMS engine 160 comprises hardware, firmware, circuitry, software, and/or combinations thereof to facilitate various aspects of the calibration techniques described herein. Correlator 146, correlator 148, and/or LMS engine 160 may also be referred to as modules, logic, instructions, algorithms, and/or the like.

One or more of correlator 146, correlator 148, and/or LMS engine 160 (or a portion thereof) comprises one or more instructions embodied within a tangible or non-transitory machine (e.g., computer) readable storage medium, which when executed by a machine causes the machine to perform the operations described herein. One or more processors, controllers, microcontrollers, microprocessors, and/or the like included in correlator 146, correlator 148, LMS engine 160, Rx DFE 144, section 104, external to Rx DFE 144, external to section 104, included in the same chip as section 104, and/or external to the chip which includes section 104 can be configured to execute the instructions.

In an embodiment, one or more of correlator 146, correlator 148, and/or LMS engine 160 (or a portion thereof) can be implemented as firmware or hardware such as, but not limited to, an application specific integrated circuit (ASIC), programmable array logic (PAL), field programmable gate array (FPGA), and/or the like. In other embodiments, one or more of correlator 146, correlator 148, and/or LMS engine 160 (or a portion thereof) may be implemented as software while other of the correlator 146, correlator 148, and/or LMS engine 160 (or a portion thereof) may be implemented as firmware and/or hardware.

Reference waveform 152 generated by waveform generator 101 can be provided to both transmit section 102 and calibration receive section 104. Provision of reference waveform 152 to calibration receive section 104 may be possible if waveform generator 101 and calibration receive section 104 are both located in the same IC chip, package, or device, for example. In some embodiments, a reference waveform 154 can be provided by baseband section 106 (or more generally, transmit section 102) to calibration receive section 104. Reference waveform 154 comprises the output of baseband section 106. As described above, the output of baseband section 106 comprises the combined signal (e.g., combination of encoded data signal and the unchanged reference waveform 152 to be provided as the input to RF section 112), if data signal 150 is also an input to baseband section 106 and is combined with the reference waveform 152, or the reference waveform 152 (e.g., reference waveform 152 after traversal through baseband section 106 without processing or change), if no data signal 150 is available or data signal 150 is not combined with reference waveform 152. Reference waveform 154 comprises a feedback from transmit section 102. Reference waveform 154 can be provided to calibration receive section 104 if both of the transmit section 102 and calibration receive section 104 are included in the same IC chip, package, or device, for example.

Reference waveform 152 and reference waveform 154 as received by calibration receive section 104 basically comprise the same signal (or provide the same signal information). Reference waveform 152 and/or reference waveform 154 received by calibration receive section 104 is also referred to as a known signal, calibration signal, known waveform, known reference signal, reference signal, and/or the like.

In some embodiments, availability of one of reference waveform 152 or 154 at calibration receive section 104 is sufficient for performance of the calibration technique disclosed herein. Correlator 146 and/or 148 is configured to calculate or determine correlations between the known signal (e.g., received reference waveform 152 and/or reference waveform 154) and the output of ADC 142 (e.g., the received over-the-air calibration signal after RF processing by components 136-142). The correlation is between the non-encoded known signal and the non-encoded known signal after traversal through the transmit section of interest (e.g., transmit section 102 to be calibrated), propagation over-the-air, and receipt by the calibration receive section 104.

The LMS engine 160 is configured to determine, based on the correlations, what calibration to apply to the transmit section 102 in order to calibrate or pre-compensate for phase, time delay, and/or amplitude offset caused to one or more portions of the transmit section 102, antenna element 124, coupling between antenna element 124 and one or more other antenna elements of the phased array antenna, environmental conditions, wear and tear of components along the transmission signal path, and/or other sources of phase, time delay, and/or amplitude offset between the known signal into transmit section 102 and receipt of the known signal by calibration receive section 104. Phase is also referred to as RF delay or RF time delay. Time delay is also referred to as baseband delay or baseband time delay. Amplitude is also referred to as gain.

The correlations comprise initial or starting values from which iterative calculations can be performed to determine the particular calibration to be applied to transmit section 102, as will be described in detail below.

In some embodiments, phase, time delay, and/or amplitude offset can occur after an antenna system has been fully calibrated prior to start of normal operations. The full calibration prior to start of normal operations comprises using individual probe measurements, processing-intensive computations, and setting of electrical components included in the antenna system based on the measurements and computations. Such full calibration scheme is referred to as park and measurement, park and measurement calibration, and/or the like. During normal operation, park and measurement calibration may not be possible. Thus, the over-the-air calibration technique disclosed herein can be used to identify and appropriately compensate for phase, time delay, and/or amplitude offsets that occur after (or in between) park and measurement. Such offsets comprise deviations from the particular phase, time delay, and amplitude settings associated with electrical components from park and measurement. At least some of the deviations from park and measurement can be due to temperature variations during normal operation.

One or both of antenna elements 124, 134 comprises part of one or more phased array antennas. Alternatively, at least one of antenna elements 124, 134 can comprise a single antenna, such as a parabolic antenna.

In FIG. 1, a single reference waveform 152 is used to calibrate a single transmit section 102 using a single calibration receive section 104. Such calibration scheme can be used to sequentially calibrate respective transmit sections included in a communications system. In some embodiments, more than one transmit section can be simultaneously calibrated using one or more calibration receive sections. Calibrating more than one transmit section at the same time reduces the total time to calibrate all of the transmit sections included in a communications system (or the subset of transmit sections included in the communications system to be calibrated).

Simultaneous calibration of a plurality of transmit sections uses a plurality of reference or calibration signals (e.g., orthogonal code based signals), in which each orthogonal code based signal of the plurality of orthogonal code based signals has a different orthogonality relative to each other. For instance, if two transmit sections are to be calibrated simultaneously using the over-the-air calibration technique disclosed herein, then a first reference signal can be generated by waveform generator 101 to transmit section 102 and a second reference signal, having a different orthogonality from the first reference signal, can be provided to another transmit section. The first and second reference signals are processed by respective transmit sections, the processing similar to that discussed above for the single calibration case. The first and second signals transmitted over-the-air are received by a calibration receive section, such as section 104. The calibration receive section performs correlations and determination of calibration factor for each of the transmit sections that transmitted the first and second signals, similar to that discussed above for the single calibration case.

In the single calibration case, in which a single reference or calibration signal is transmitted from a transmit section of interest, the calibration receive section is configured to generate correlations comprising non-differential or single phase, time delay, and/or amplitude measurements or estimates. In the multi calibration case, in which more than one reference or calibration signals are simultaneously transmitted by more than one transmit section of interest, the calibration receive section is configured to generate correlations comprising non-differential/single phase, time delay, and/or amplitude measurements or estimates for each of the different reference signals or differential phase, time delay, and/or amplitude measurements or estimates between the different reference signals.

In some embodiments, a baseband section is optional in the calibration receive section 104.

Figure 2:
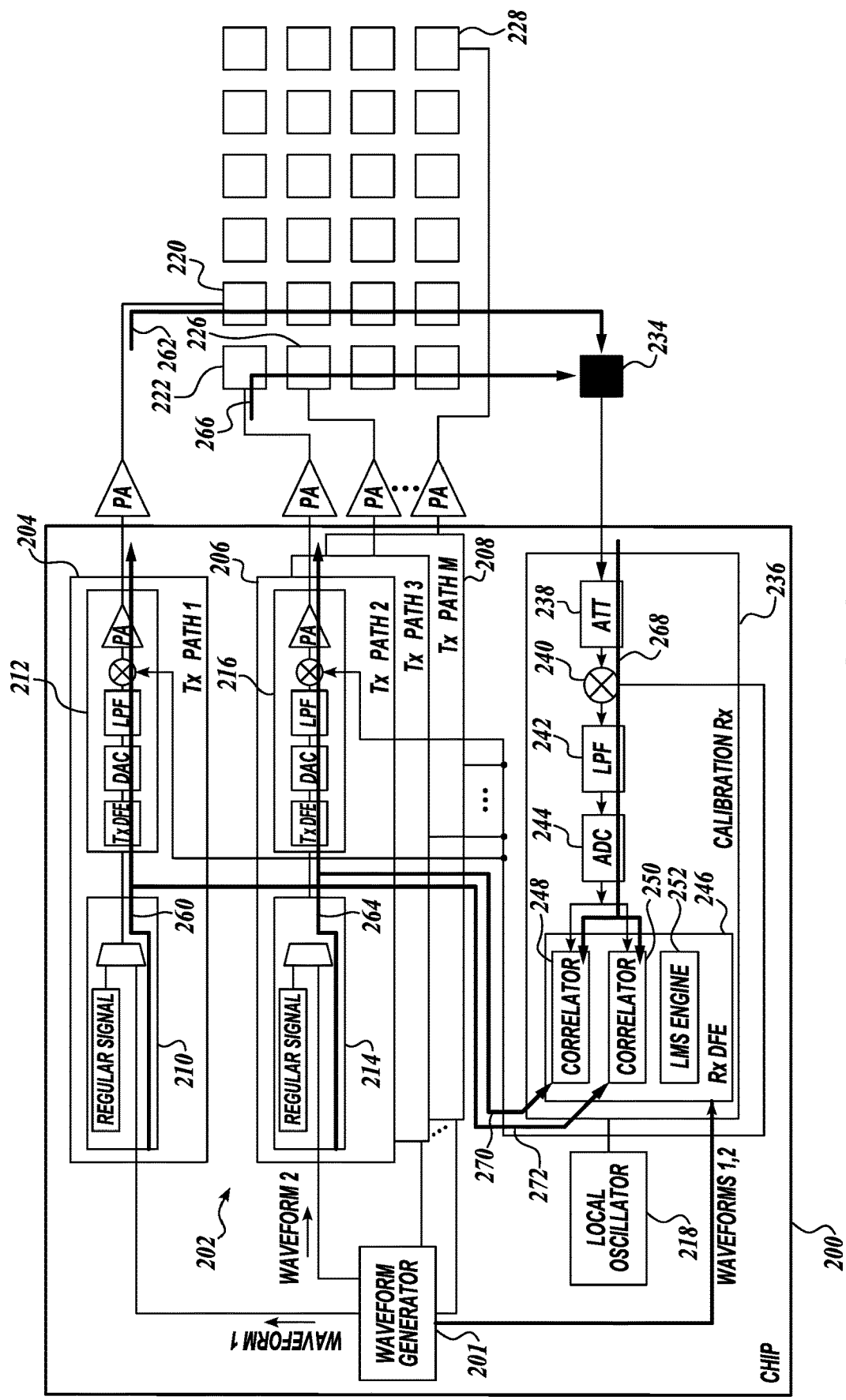
FIG. 2 is an example illustration of a block diagram showing implementation of an intra-chip transmit calibration scheme in accordance with various aspects of the present disclosure.

FIG. 2 is an example illustration of a block diagram showing implementation of an intra-chip calibration scheme in accordance with various aspects of the present disclosure. FIG. 2 shows an implementation in which more than one transmit section can be simultaneously calibrated. A single integrated circuit (IC) chip 200 includes a waveform generator 201, a plurality of transmit sections 202, a calibration receive section 236, and a local oscillator 218. The waveform generator 201 is configured to generate first and second reference signals or waveforms that comprise two different calibration signals (denoted as waveform 1 and waveform 2). First and second reference signals differ from each other in at least orthogonality. Waveform generator 201 may be similar to waveform generator 101.

The plurality of transmit sections 202 comprises at least M number of transmit sections, one for each of the M signal paths associated with the M antenna elements supported by the chip 200. The M antenna elements are antenna elements included in an antenna lattice of a phased array antenna. Each transmit section of the plurality of transmit sections 202 is identical to each other. Each of the transmit sections 202 can be similar to transmit section 102.

Calibration receive section 236 is similar to calibration receive section 104. A calibration antenna element 234 is electrically coupled with the calibration receive section 236. The calibration antenna element 234 comprises an antenna element dedicated for calibration of the transmit sections such as one or more of transmit sections 202. Alternatively, calibration antenna element 234 can comprise an antenna element switchable between use for calibration and for receiving normal or regular transmissions.

Local oscillator 218 is electrically coupled with each of the transmit sections 202 and the calibration receive section 236. Local oscillator 218 is configured to generate and provide a common local oscillator signal (e.g., a common digital clock signal) to each of the transmit sections 202 and calibration receive section 236. Alternatively, local oscillator 218 can be located external to chip 200.

In some embodiments, first and second reference signals generated by waveform generator 201 comprises the respective reference or calibration signals provided to two transmit sections of the plurality of transmit sections 202. For example, a transmit section 204 receives the first reference signal or waveform (denoted as waveform 1), and a transmit section 206 receives the second reference signal or waveform (denoted as waveform 2). First and second reference signals comprise the calibration signals for respective transmit sections 204, 206.

Transmit section 204 electrically couples with an antenna element 220 of the M antenna elements. Transmit section 204 is associated with Tx signal path 1 of the M paths, and correspondingly, antenna element 220 may be considered to be the i=1 antenna element, for i=1 to M. Transmit section 206 electrically couples with an antenna element 222 of the M antenna elements. Transmit section 206 is associated with Tx signal path 2 of the M paths. The remaining transmit sections 202 likewise electrically couples with respective antenna elements, such as a transmit section 208 for path M associated with antenna element 228. Each of the M paths may include a PA located external to chip 200 between the respective transmit section and associated antenna element. A bandpass filter may be included in each transmit section.

In some embodiments, each transmit section of the plurality of transmit sections 202 is configured to receive a data signal to be transmitted from a modem (e.g., data signal 150). The data signal comprises a regular signal, a normal signal, and/or the like that would be transmitted during regular or normal operation of the transmit section.

Transmit section 204 includes a baseband section 210 and a RF section 212 similar to respective sections 106 and 112. Baseband section 210 is configured to encode the received data signal and combine or duplex with the first reference signal (not encoded or processed as discussed above), thereby generating a combined signal as the output of baseband section 210. Alternatively, baseband section 210 can be configured to not combine or duplex the encoded data signal with the first reference signal, thereby providing the first reference signal as the output of baseband section 210. If no data signal is provided to transmit section 204, then baseband section 210 passes through the first reference signal as the output of baseband section 210. The output of baseband section 210 comprises the input to RF section 212. The RF section 212 performs RF processing on the known calibration signal (the output of baseband section 210) suitable for antenna element 220 to transmit the known calibration signal. The known calibration signal is also provided to correlator 250. Alternatively, if the first reference signal is provided to correlator 250 by waveform generator 201, then providing the known calibration signal by transmit section 204 can be optional. A signal pathway 260 is shown representative of the traversal of the first reference signal as discussed above.

Transmit section 206 includes a baseband section 214 and a RF section 216 similar to respective sections 106 and 112. Baseband section 214 is configured to encode the received data signal and combine or duplex with the second reference signal (not encoded or processed as discussed above), thereby generating a combined signal as the output of baseband section 214. Alternatively, baseband section 214 can be configured to not combine or duplex the encoded data signal with the second reference signal, thereby providing the second reference signal as the output of baseband section 214. If no data signal is provided to transmit section 206, then baseband section 214 passes through the second reference signal as the output of baseband section 214. The output of baseband section 214 comprises the input to RF section 216. The RF section 216 performs RF processing on the known calibration signal (the output of baseband section 214) suitable for antenna element 222 to transmit the known calibration signal. The known calibration signal is also provided to correlator 248. Alternatively, if the second reference signal is provided to correlator 248 by waveform generator 201, then providing the known calibration signal by transmit section 206 can be optional. A signal pathway 264 is shown representative of the traversal of the second reference signal as discussed above.

Remaining transmit sections 206 (for paths 3 to M) generate RF signals for respective inputted data signals and are radiated by respective antenna elements.

The RF signals radiated by the M antenna elements are detected by the calibration antenna element 234, including RF signals associated with first and second reference signals from antenna elements 220 and 222 (see respective signal pathways 262 and 266). The RF signals associated with first and second reference signals are transmitted at the same time by respective antenna elements 220, 222.

The detected RF signals associated with first and second reference signals are processed by calibration receive section 236 (e.g., down converted to remove the carrier frequency, converted into a digital signal, etc.) and received at correlators 248, 250 included in Rx DFE 246 (see signal pathway 268). The over-the-air received first reference signal and the first reference signal (provided either as the output of baseband section 210 or from waveform generator 201) comprise the inputs to correlator 250. The over-the-air received second reference signal and the second reference signal (provided either as the output of baseband section 214 or from waveform generator 201) comprise the inputs to correlator 248.

Correlator 250 is configured to determine correlations between the received first reference signal and the first reference signal. The determined correlations are provided to LMS engine 252 for use in determination of a calibration factor for the transmit section 204. The determined correlations comprise a quantification of the similarity between the received first reference signal and the first reference signal.

Correlator 248 is configured to determine correlations between the received second reference signal and the second reference signal. The determined correlations are provided to LMS engine 252 for use in determination of a calibration factor for the transmit section 206. The determined correlations comprise a quantification of the similarity between the received second reference signal and the second reference signal.

The remaining transmit sections 202 can be calibrated employing a similar calibration scheme.

Figure 5:
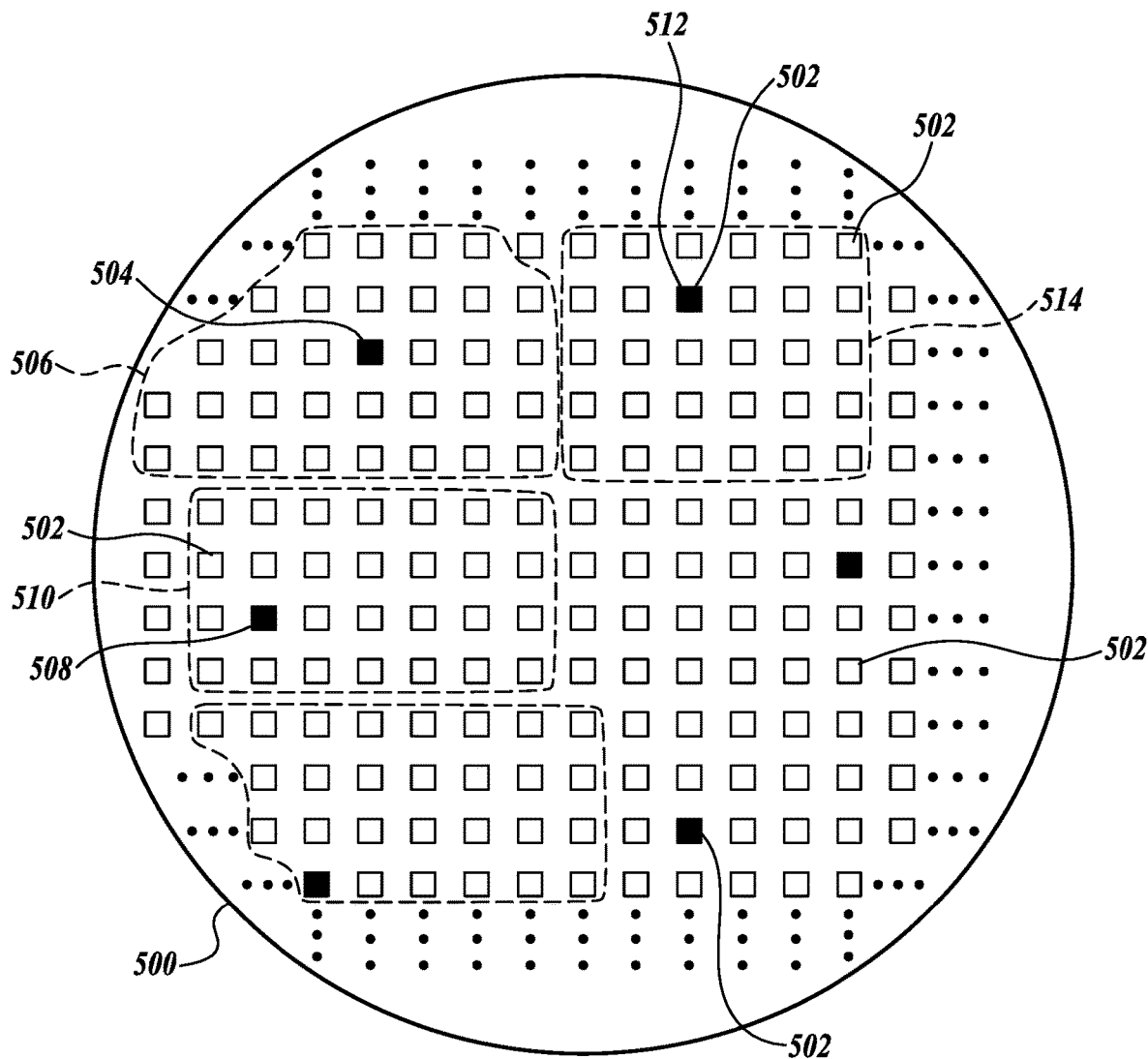
FIG. 5 is an example illustration of a top view of an antenna lattice of a phased array antenna in accordance with various aspects of the present disclosure.

FIG. 5 is an example illustration of a top view of an antenna lattice 500 of a phased array antenna in accordance with various aspects of the present disclosure. A plurality of antenna element 502 is distributed to form the antenna lattice 500 having a particular antenna aperture. Most of the antenna elements 502 comprise antenna elements associated with respective transmit sections, such as transmit section 204. In addition to such transmitter antenna elements, a small subset of antenna elements 502 can comprise calibration antenna elements. Antenna elements denoted as black squares comprise the calibration antenna elements (e.g., calibration antenna elements 512, 504, 508).

In some embodiments, a single calibration antenna element is included in each subset of the plurality of antenna elements 502 (e.g., each of subsets 506, 514, 510), in which the transmitter antenna elements 502 of each subset comprise the antenna elements that are within dynamic (receiving) range of the particular calibration antenna element. For example, calibration antenna element 504 is located to be within dynamic (receiving) range of the other antenna elements 502 within the subset 506. Calibration antenna element 234 is an example of a single calibration antenna element within dynamic range of antenna elements 220, 222, 226, and 228, thereby collectively forming a subset or cluster. Because calibration antenna element 234 is within dynamic range (e.g., able to sufficiently receive transmissions with sufficient SNR) of antenna elements associated with transmit sections within the same chip 200, both transmit and receive functions can be performed in the same chip 200 to calibrate the transmit sections of chip 200.

It is contemplated that chip 200 may be configured to handle both transmitting and receiving of regular/normal/wanted signals. To this end, chip 200 can further include a plurality of receive/receiver sections associated with receipt and processing of normal/regular/wanted signals in addition to the single calibration receive section 236 associated with calibration-related operations and the plurality of transmit sections 202.

Figure 3:
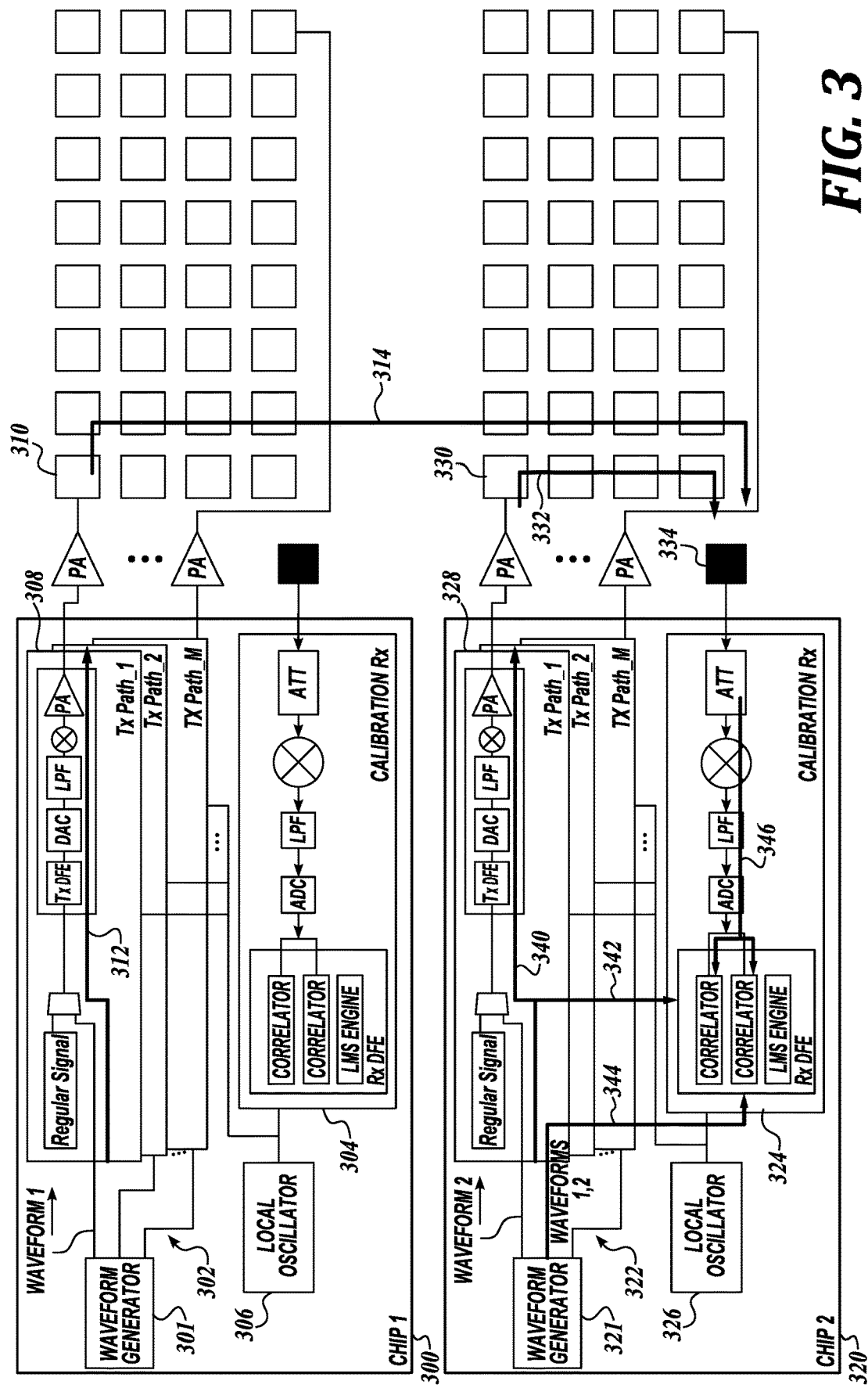
FIG. 3 is an example illustration of a block diagram showing implementation of an inter-chip transmit calibration scheme for a same subset or cluster of antenna elements in accordance with various aspects of the present disclosure.

FIG. 3 is an example illustration of a block diagram showing implementation of an inter-chip calibration scheme for a same subset or cluster of antenna elements in accordance with various aspects of the present disclosure. Each of chips 300 and 320 is similar to chip 200. Antenna elements 310, 330, and 334 comprise antenna elements in the same subset or cluster, such as the subset 506. Antenna element 310 is associated with transmit section 308 included in the chip 300 (e.g., chip 1), antenna element 330 is associated with transmit section 328 included in the chip 320 (e.g., chip 2), and antenna element 334 is associated with a calibration receive section 324 also included in chip 320.

However, in contrast to FIG. 2 in which first and second reference signals are transmitted and received by components included in the same chip 200, first reference signal transmitted via transmit section 308 of chip 300 and antenna element 310 is detected by calibration receive section 324 included in chip 300 and the second reference signal transmitted using transmit section 328 of chip 320 and antenna element 330 is detected by the calibration receive section 324 of chip 320. The first reference signal transmitted by transmit section 308 is received by a calibration receive section located in a different chip from the transmit section 308.

Calibration receive section 324 receives a first reference signal, via a signal pathway 344, from a waveform generator 321 located locally in chip 320. This first reference signal is the same as the first reference signal (denoted as waveform 1) provided by waveform generator 301 to transmit section 308 for transmission.

Calibration receive section 324 receives a second reference signal, via a signal pathway 342, from the baseband section of transmit section 328. Alternatively, the second reference signal can be provided by waveform generator 321 to calibration receive section 324, since waveform generator 321 is located in the same chip 320 as calibration receive section 324.

Calibration receive section 324 then processes the received first and second reference signals and the (known) first and second reference signals as discussed above in connection with FIG. 2. The calibration factors determined by the LMS engine included in Rx DFE 324 are applied to transmit sections 308, 328.

The remaining transmit sections 302, 322 are similarly calibrated by injection of known reference/calibration signals, which may be received by a calibration receive section in the same or different chip from the transmit sections undergoing calibration.

Figure 4:
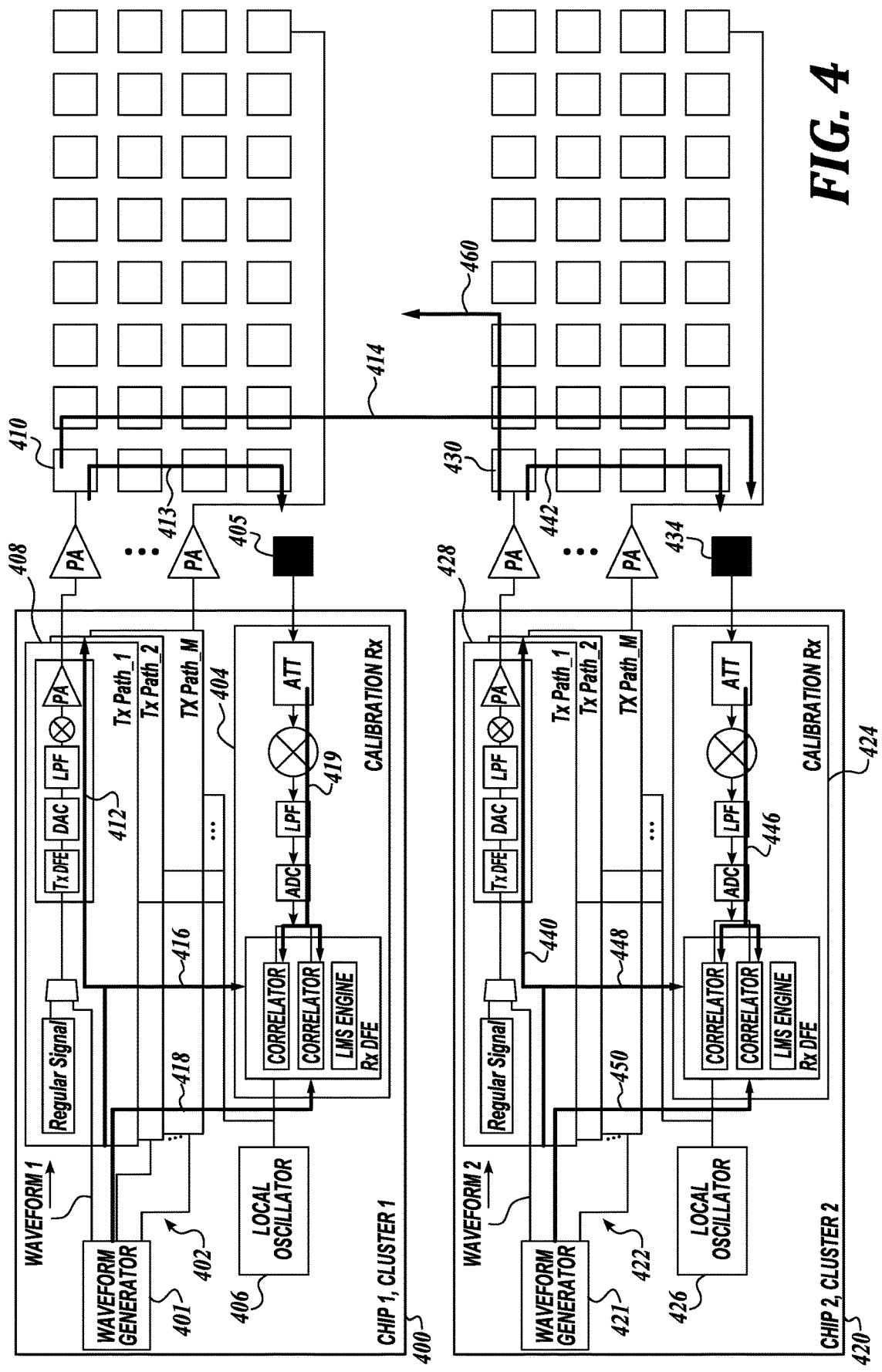
FIG. 4 is an example illustration of a block diagram showing implementation of an inter-chip transmit calibration scheme involving two subsets or clusters of antenna elements in accordance with various aspects of the present disclosure.

FIG. 4 is an example illustration of a block diagram showing implementation of an inter-chip calibration scheme involving two subsets or clusters of antenna elements in accordance with various aspects of the present disclosure. Each of chips 400 and 420 is similar to chip 200 except chip 400 is associated with a first subset or cluster (denoted as cluster 1) of the antenna elements and chip 420 is associated with a second subset or cluster (denoted as cluster 2) of the antenna elements, different from the first subset/cluster. For example, chip 400 may be electrically coupled with at least some of the antenna elements 502 included in subset 506 and chip 420 may be electrically coupled with at least some of the antenna elements 502 included in subset 510.

Because chips 400 and 420 are associated with different antenna element subsets/clusters, all of the transmissions from antenna elements of the first subset/cluster may not be receivable or sufficiently receivable (due to weak signal strength, partial signal receipt, etc.) by antenna elements associated with a different subset/cluster such as the second subset/cluster. Likewise, transmissions from antenna elements of the second subset/cluster may not be fully receivable by antenna elements of the first subset/cluster.

In FIG. 4, a first reference/calibration signal provided by a waveform generator 401 to a transmit section 408 is transmitted via an antenna element 410. The transmitted signal is received by each of a calibration receive section 404 included in the same chip 400 as the transmit section 408, via a calibration antenna element 405 (see signal pathway 413), and also by a calibration receive section 424 included in the chip 420, via a calibration antenna element 434 (see signal pathway 414). Either of the calibration receive sections 404, 424 can extract the received first reference signal from the rest of the signals received to perform calibration of transmit section 408. The first reference signal can be provided to calibration receive section 404 by waveform generator 401 (see signal pathway 418). The first reference signal (alone or combined with a data signal) at the output of the baseband section of transmit section 408 can be provided to calibration receive section 404 by transmit section 408 (see signal pathway 416). Because calibration receive section 424 is located in a different chip from chip 400, waveform generator 421 included in chip 420 provides the first reference signal to calibration receive section 424.

The waveform generators in the different chips are configured to generate the same reference signals. And as discussed above, the output of the baseband section of the transmit section of interest comprises the injected reference signal or the reference signal with the combined data signal constituting noise relative to the reference signal. Thus, the reference signal provided to a calibration receive section is the same regardless of whether it is provided by waveform generator 401, transmit section 408, waveform generator 421, and/or the like.

A second reference/calibration signal provided by waveform generator 421 is the input to transmit section 428 included in chip 420. The second reference signal is processed by transmit section 428 and transmitted via antenna element 430. The transmitted second reference signal is received by calibration antenna element 434 and associated calibration receive section 424 (see signal pathway 442). However, calibration antenna element 405 included in the first subset/cluster is unable to (fully) receive the transmitted second reference signal (see signal pathway 460). Accordingly, calibration receive section 424 is configured to perform calibration determination for transmit section 428. The second reference signal is provided to calibration receive section 424 from one or both of the transmit section 428 (see signal pathway 448) or waveform generator 421 (see signal pathway 450).

The remaining transmit sections 402, 422 are similarly calibrated by injection of known reference/calibration signals, which may be received by a calibration receive section in the same or different chip from the transmit section undergoing calibration.

In some embodiments, the transmit sections to be calibrated in FIGS. 1-4 include digital beamformers (DBFs) in the baseband sections and correspondingly are configured to perform digital beamforming of regular/normal signals to be transmitted.

Figures 6A, 6B:
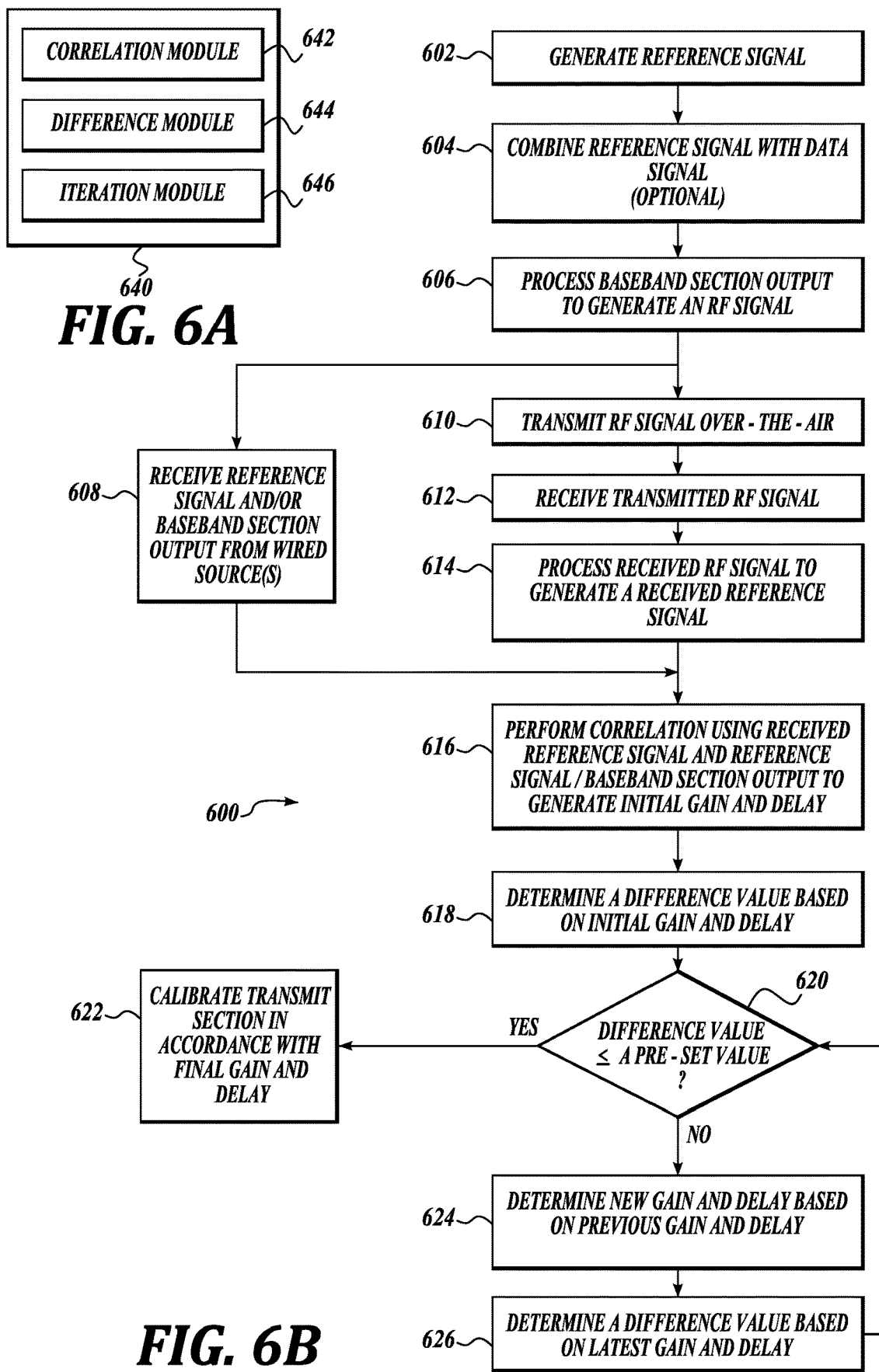
FIG. 6A illustrates a block diagram showing example modules of correlators and least means square (LMS) engine configured to perform an over-the-air calibration technique in accordance with various aspects of the present disclosure.
FIG. 6B illustrates a flow diagram showing a process to calibrate a transmit section and associated antenna element using the over-the-air calibration technique in accordance with various aspects of the present disclosure.

FIG. 6A illustrates a block diagram showing example modules of correlators and LMS engine configured to perform an over-the-air calibration technique in accordance with various aspects of the present disclosure. In FIG. 6A, a correlation module 642, a difference module 644, and an iteration module 646 are configured to perform computations and processing associated with performance of over-the-air calibration. Correlation module 642 can be included in correlators shown in FIGS. 1-4 (e.g., correlators 146, 148, etc.), and difference module 644 and iteration module 646 can be included in the LMS engines shown in FIGS. 1-4.

In a calibration receive section, the number of correlators, the number of LMS engine, the locations of the correlators and LMS engine within the calibration receive section, and the different functionalities between the correlators and LMS engine discussed above are an implementation example and other configurations are within the scope of the present disclosure. For example, a single correlator can be included in each calibration receive section rather than two, the functionalities of the correlators and LMS engine can be performed by a single processor or computational component, the correlators and LMS engine can be located in the calibration receive section other than the Rx DFE, at least a portion of the functionalities of the correlators and LMS engine can be performed external to the calibration receive section, and/or the like.

A calibration component 640 associated with a calibration receive section includes modules 642-646. Consistent with the various possible implementations of the correlators and LMS engine, calibration component 640 can be located within or external to calibration receive section. Calibration component 640 is also referred to as a calibration section.

In some embodiments, one or more of modules 642-646 (or a portion thereof) comprises one or more instructions embodied within a tangible or non-transitory machine (e.g., computer) readable storage medium, which when executed by a machine causes the machine to perform the operations described herein. Modules 642-646 (or a portion thereof) may be stored local or remote from the calibration receive section. One or more processors included in component 640 can be configured to execute modules 642-646 (or a portion thereof). In alternative embodiments, one or more of modules 642-646 (or a portion thereof) may be implemented as firmware or hardware such as, but not limited to, an application specific integrated circuit (ASIC), programmable array logic (PAL), field programmable gate array (FPGA), and/or the like. In other embodiments, one or more of modules 642-646 (or a portion thereof) may be implemented as software while other of the modules 642-646 (or a portion thereof) may be implemented as firmware and/or hardware.

FIG. 6B illustrates a flow diagram showing a process 600 to calibrate a transmit section and associated antenna element using the over-the-air calibration technique in accordance with various aspects of the present disclosure. At a block 602, a waveform generator (e.g., waveform generator 101) generates a reference calibration signal comprising an orthogonal code based signal. In some embodiments, the generated reference signal comprises an orthogonal code based signal $s_{Rx}(t)$ having the following form.

$$s_{Rx} = Cx(t-\tau_{BB}-\tau_{RF})e^{2j\pi F(t-\tau_{RF})} \quad \text{Eq. (1)}$$

where C=gain, $\tau_{BB}$=baseband delay, $\tau_{RF}$ RF delay (phase), and total delay $\tau = \tau_{BB} + \tau_{RF}$.

The generated reference signal is provided to the transmit section to be calibrated (e.g., transmit section 102). Such transmit section (also referred to as the transmit section of interest) combines the reference signal with the data signal in the baseband section (e.g., baseband section 106), at a block 604. Block 604 is optional if transmit section is configured to ignore the received data signal and/or if no data signal is provided to the transmit section of interest. The output of the transmit section's baseband section is the reference signal (not encoded as would be for the data signal) if block 604 is omitted or a combined signal comprising the reference signal (not encoded) and the encoded data signal. The encoded data signal component of the combined signal comprises noise relative to the reference signal component.

Next, at a block 606, the RF section (e.g., RF section 112) of the transmit section of interest processes the baseband section output to generate a RF signal of the reference signal or combined signal, whichever comprises the baseband section output. The antenna element (e.g., antenna element 124) electrically coupled with the RF section transmits the RF signal over-the-air, at a block 610.

The transmitted RF signal is received by a calibration receive section (e.g., calibration receive section 104), at a block 612. In response, the calibration receive section processes the received RF signal (performing RF signal processing to down convert, convert to a digital signal, etc.) to generate a received reference signal, at a block 614.

The calibration receive section also receives the reference signal from the waveform generator and/or the baseband section output from the transmit section of interest, via a wired connection, at a block 608. Which signal is provided to the calibration receive section can depend on which source is local (e.g., in the same chip or package) to the calibration receive section. As discussed above, if, for example, the transmit section of internet and the calibration receive section are located in different chips or packages, then the baseband section output is not available to the calibration receive section. A waveform generator local to the calibration receive section can provide the reference signal to the calibration receive section. Note that this waveform generator is a different waveform generator from the one that generated and provided the reference signal to the transmit section of interest.

In possession of both the reference signal/baseband section output and the received reference signal, the calibration receive section determines correlations between the two signals, at a block 616. In some embodiments, the correlation module 642 associated with the calibration receive section is configured to determine the correlation between the reference signal/baseband section output and the received reference signal. The correlation values or coefficients quantify the degree of correlation between the two signals. The correlations provide an initial estimate of the gain C, RF delay (phase) $\tau_{RF}$, and total delay $\tau$ (collectively referred to as the initial gain and delay).

Next, at a block 618, the difference module 644 associated with the calibration receive section is configured to determine a complex gain C' based on the initial gain and delay, in accordance with the following equation.

$$C' = Ce^{-2\pi F \tau_{RF}} \quad \text{Eq. (2)}$$

Difference module 644 calculates a difference $D_\tau$ using the initial gain and delay values and Equations 1 and 2 as follows:

$$D_\tau = |C'x_\tau - s_{Rx}|^2 \quad \text{Eq. (3)}$$

where $s_{Rx}$ is the vector of the reference signal from block 608, and $x_\tau$ is the vector of the received reference signal (the transmitted reference signal received by calibration receive section and including total delay $\tau$). Difference $D_\tau$ is an estimated measure of the error in the transmitted signal if particular gain and delay (compensation) values are applied. The goal is to minimize difference $D_\tau$ by particular selection of gain and delay values. As will be described below, acceptable gain and delay values can be determined by iteratively estimating new gain and delay values based on the previous estimated gain and delay values. Each new gain and delay values comprise small changes relative to the previous estimates using gradient and interpolation techniques. Successive iterations of gain and delay value estimates result in gain and delay values converging to particular values associated with a minimized difference $D_\tau$ (or the difference being within a pre-set value). Difference $D_\tau$ is also referred to as an error indicator, difference value, and/or the like.

If the difference value calculated at block 618 is equal to or less than a pre-set value (yes branch of block 620), then process 600 proceeds to block 622. At block 622, the final gain and delay values—in this case, the initial gain and delay from block 616—comprise the particular values by which the transmit section of interest is calibrated. As will be described below in connection with FIG. 7A, IQ gain and phase compensator(s) and time delay filter(s) included in the transmit section are set in accordance with the final gain and delay values estimated from injection of the reference signal to the transmit section of interest. The IQ gain and phase compensator(s) are configured to pre-compensate for particular gain and RF delay (phase) offsets that are now known to exist (and quantified) in signal transmissions performed by transmit section of interest and associated antenna element. The time delay filter(s) are configured to pre-compensate for particular baseband delay offset now known to exist. The final estimated gain and delay values permit gain, baseband delay, and/or RF delay calibration.

If the difference value is greater than the pre-set value (no branch of block 620), then process 600 proceeds to block 624. At block 624, the iteration module 646 in conjunction with the difference module 644 are configured to determine a new estimate of the gain and delay values based on the immediately previous gain and delay values. In the first iteration, the immediately previous gain and delay are those from block 616. In a given iteration, estimate a new $x_\tau$ (reference signal delayed by value of $\tau$) by interpolation of previous samples $x_0$ to $x_1$. Then calculate a new gain $C_{new}$ as follows.

$$C_{new} = \frac{x_\tau^H \cdot s_{Rx}}{|x_\tau|^2} \quad \text{Eq. (4)}$$

The new estimated delay r is an update of the immediately previous estimated $\tau$ in accordance with a stochastic gradient.

With the new or latest gain and delay values determined, a new difference value $d(\tau)$ can be calculated by the difference module 644, at a block 626, in accordance with the following equations.

$$C = (1-\alpha) \cdot C_{old} + \alpha \cdot C_{new} \quad \text{Eq. (5)}$$

$$d(\tau) = C \cdot x_\tau - s_{Rx} \quad \text{Eq. (6)}$$

where $D_\tau$ in Equation 3 is the square of the absolute value of error signal $d(\tau)$ of Equation 6. New delay value r is calculated to minimize the absolute value of error signal $d(\tau)$ using the following equation derived from a LMS algorithm.

$$\tau = \tau - \mu \cdot \nabla |d(\tau)|^2 \quad \text{Eq. (7)}$$

The latest difference value is checked at block 620 to see if the difference is now within the pre-set value, at block 620. If the difference is greater than the pre-set value (no branch of block 620), then the next iteration is performed by returning to blocks 624-626 to determine the next estimates of gain and delay. One or more iterations occur until the condition of block 620 is satisfied and process 600 can proceed to block 622.

In some embodiments, approximately 7-8 or fewer iterations can estimate suitable gain and delay values for which the difference between the reference signal and the received reference signal will be within an acceptable range (e.g., the pre-set value of block 620). Such latest or final gain and delay values are the particular pre-compensation values to apply to regular signals to be transmitted in the transmit section of interest in order to proactively cancel out gain and delay offsets that will be introduced by the transmit section of interest and/or associated antenna element. The final gain and delay values comprise a gain value, a baseband delay value, and/or a RF delay value (phase).

Figure 7A:
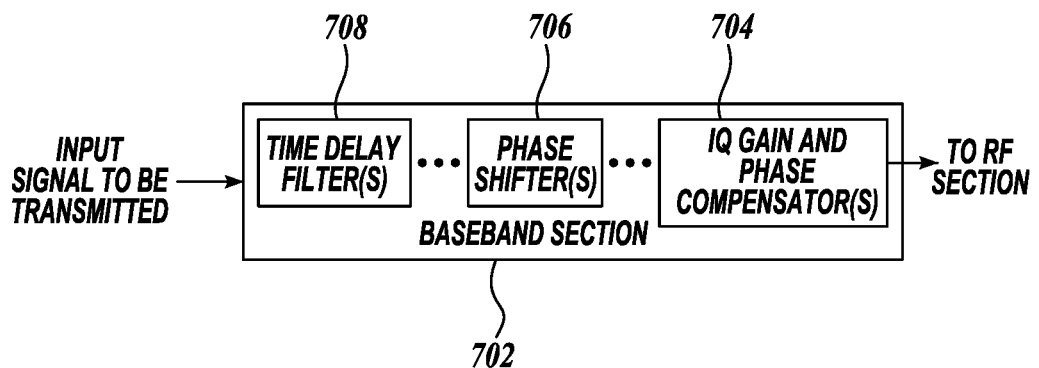
FIG. 7A illustrates an example block diagram showing gain and delay compensator(s) included in a transmit section of interest in accordance with various aspects of the present disclosure.

FIG. 7A illustrates an example block diagram showing gain and delay compensator(s) included in a transmit section of interest in accordance with various aspects of the present disclosure. In some embodiments, a baseband section 702 of the transmit section of interest includes, without limitation, IQ gain and phase compensator(s) 704, phase shifter(s) 706, and time delay filter(s) 708. Each of IQ gain and phase compensator(s) 704, phase shifter(s) 706, and time delay filter(s) 708 can comprise one or more electrical components.

IQ gain and phase compensator(s) 704 are set in accordance with the final gain and RF delay (phase) values determined in process 600, at block 622. Time delay filter(s) 708 are set in accordance with the final baseband delay value determined in process 600. Time delay filter(s) 708 comprise baseband delay compensators. IQ gain and phase compensator(s) 704 are also referred to as IQ gain and RF delay compensators. In some embodiments, additional gain and RF delay compensators and/or baseband delay compensators may be included in the transmit section of interest, such as, within the RF section.

The RF section of the transmit section of interest can comprise a quadrature direct conversion transmitter (IQ) section, a quadrature direct conversion transmitter, or the like. The components within the RF section can define two parallel signal paths, a first set of components configured to process the I portion of a complex-valued signal and the second set of components configured to process the Q portion of the complex-valued signal. The IQ gain and phase compensator(s) 704 are appropriately configured to apply compensation and output compensated I and Q portions of the complex-valued signal to the respective signal paths defined in the RF section.

Returning to FIG. 6B, for simultaneous calibration of more than one transmit sections of interest, such as discussed in connection with FIGS. 2-4, process 600 can be performed in parallel using respective first and second reference signals. As discussed above, the transmitted first and second reference signals can be received by the same or different calibration receive sections. If the first transmitted reference signal is received by a first calibration receive section and the second transmitted reference signal is received by a second calibration receive section, then the first calibration receive section performs blocks 608, 612-626 for the transmit section of interest that transmitted the first reference signal and the second calibration received section performs blocks 608, 612-626 for the transmit section of interest that transmitted the second reference signal. In simultaneous calibration of more than one transmit section of interest, the correlation module 642 at block 616 can be configured to calculate differential gain and delay measurements or estimates between the first and second reference signals, instead of non-differential or absolute estimates.

Figure 8:
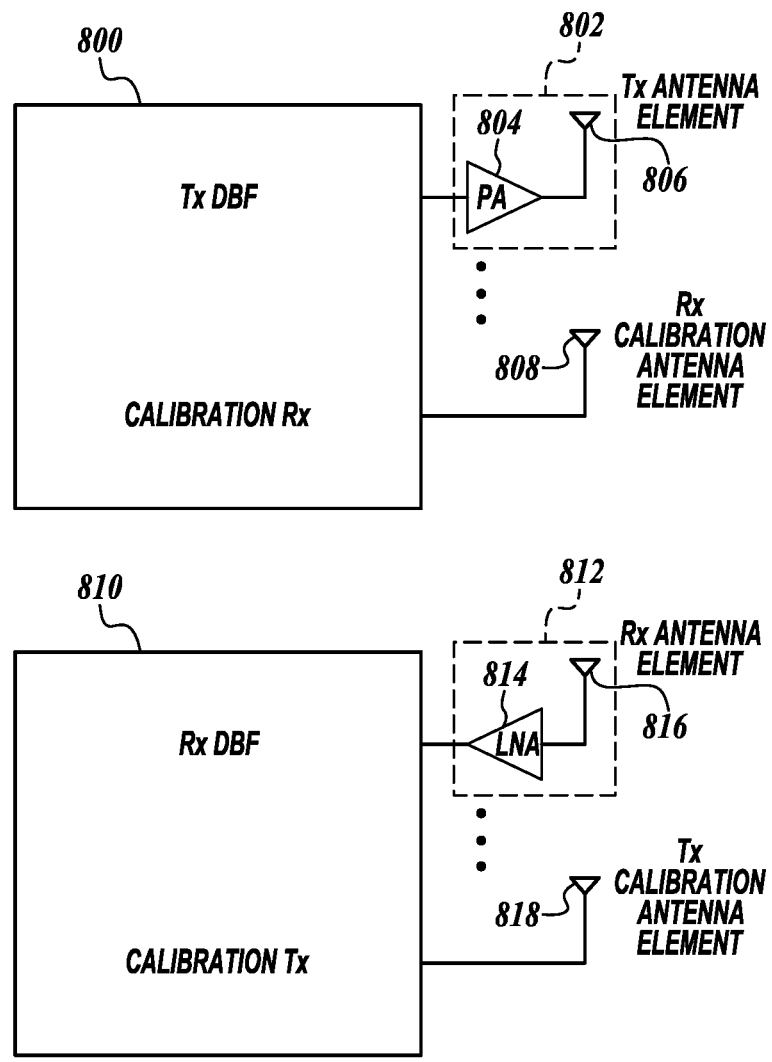
FIG. 8 is an example illustration of a block diagram showing integrated circuit (IC) chips and associated antenna elements in accordance with various aspects of the present disclosure.

FIG. 8 is an example illustration of a block diagram showing IC chips 800 and 810 and associated antenna elements in accordance with various aspects of the present disclosure. Chip 800 is similar to chip 200, 300, 320, 400, or 420 that includes a plurality of digital beamforming transmit sections (also referred to as Tx DBFs) that electrically couples with respective Tx antenna elements 802 and a single calibration receive section (also referred to as a calibration Rx) that electrically couples with a calibration antenna element 808. Each of the Tx antenna elements 802 can include a PA 804 and an antenna 806. Although not shown, a PA can also be disposed between chip 800 and calibration antenna element 808.

The calibration schemes described herein can also be performed for receive sections that would be used to receive normal, regular, or wanted signals using a single dedicated calibration transmit section included in each chip. Continuing with the above nomenclature, instead of Tx DBFs and calibration Rx as in chip 800, a chip 810 can include, respectively, a plurality of digital beamforming receive sections (also referred to as Rx DBFs) and a single calibration transmit section (also referred to as a calibration Tx) to calibrate the digital beamforming receive sections. The plurality of digital beamforming receive sections is electrically coupled with respective Rx antenna elements 812 and the single calibration transmit section electrically couples with a calibration transmit antenna element 818. Each of the Rx antenna elements 812 includes a low noise amplifier (LNA) 814 and an antenna 816. Although not shown, a LNA can also be disposed between chip 810 and calibration antenna element 818.

One calibration antenna element associated with a calibration transmit section is included in each subset/cluster of antenna elements of a phased array antenna associated with a receiver or receiver panel. And as described above in connection with FIGS. 2-4, intra- and/or inter-chip calibration schemes are also applicable for chip(s) including Rx DBFs and calibration Txs.

In an embodiment, an IC chip can include a calibration receive section, a calibration transmit section, a plurality of receive sections, a plurality of transmit sections, and a waveform generator.

Figure 9:
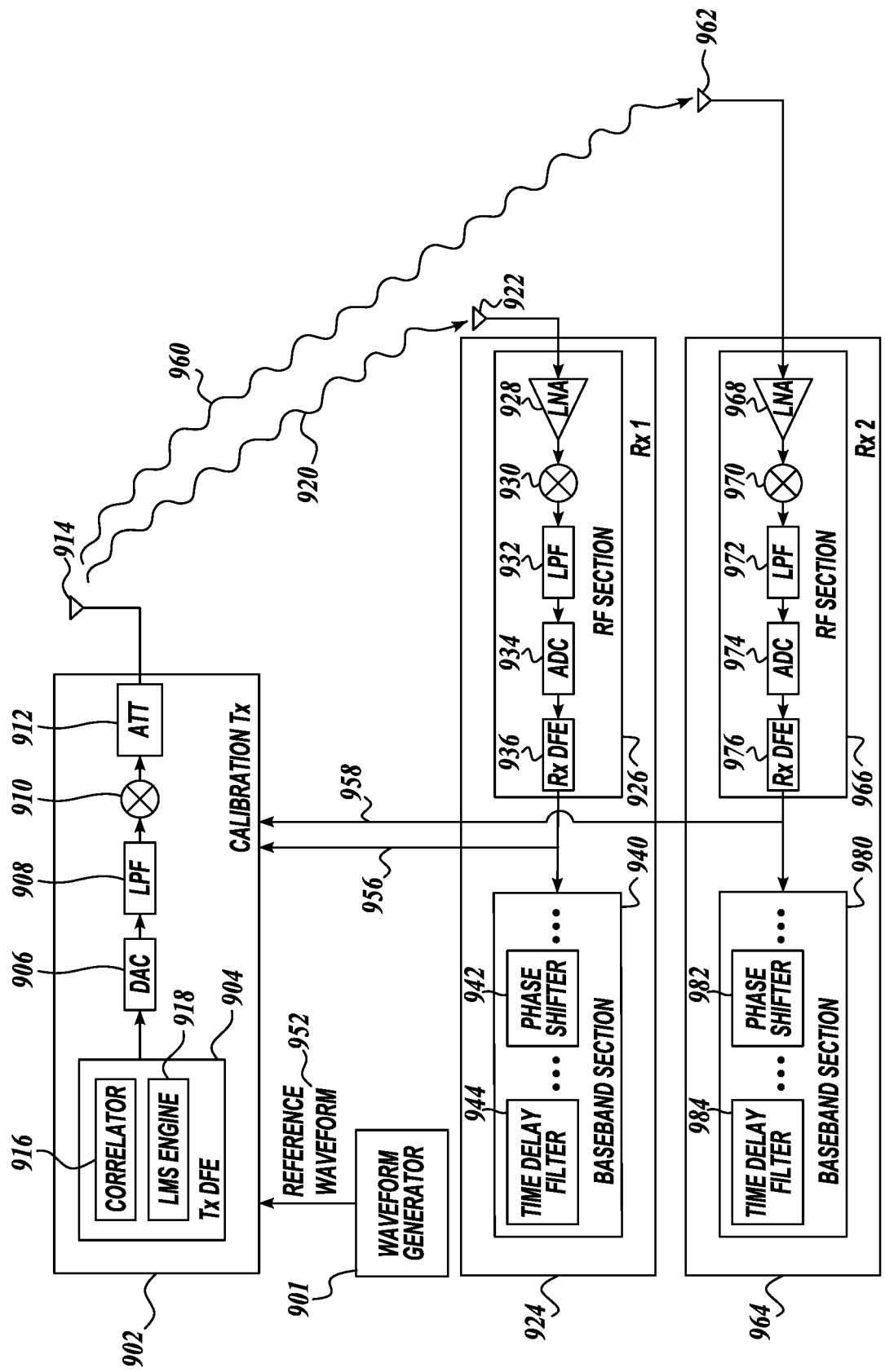
FIG. 9 is an example illustration of a block diagram showing over-the-air calibration components in connection with receive section calibration in accordance with various aspects of the present disclosure.

FIG. 9 is an example illustration of a block diagram showing over-the-air calibration components in connection with receive section calibration in accordance with various aspects of the present disclosure. In some embodiments, a calibration transmit section 902 is electrically coupled to a calibration antenna element 914. Calibration transmit section 902 includes a Tx DFE 904, a DAC 906, a LPF 908, a mixer 910, and a RF attenuator (Att) 912. DAC 906, LPF 908, and mixer 910 are similar to respective DAC 116, LPF 118, and mixer 120. Calibration transmit section 902 is also referred to as a calibration transmitter, calibration Tx, and/or the like.

Tx DFE 904 is configured to perform one or more processing functions relating to channelization and/or sample rate conversion, as necessary to ready inputted digital signals (e.g., the reference signal 952 and the received reference signal from the receive section of interest) into a format suitable for calibration-related determinations.

Tx DFE 904 includes a correlator 916 and a LMS engine 918. It is understood that although a single correlator 916 is shown, correlator 916 can comprise more than one correlator. Correlator 916 is similar to correlators 146, 148, and LMS engine 918 is similar to LMS engine 160. Correlator 916 and LMS engine 160 can be located external to Tx DFE 904, external to calibration transmit section 902, and/or the like.

A waveform generator 901 is configured to generate and provide a reference waveform or signal 952 to calibration transmit section 902. Waveform generator 901 is similar to waveform generator 101, and reference signal 952 is the same as reference waveform 152. Reference signal 952 is also referred to as a calibration signal or waveform, a reference calibration signal or waveform, and/or the like.

The reference signal 952 undergoes RF processing in the calibration transmit section 902. Namely, the reference signal 952 is converted from a digital signal into an analog signal by DAC 906, filtered by LPF 908, up converted to a carrier frequency via mixer 910, and attenuated by RF attenuator 912. The resulting outputted signal is referred to as a RF signal. The RF signal is provided to calibration antenna element 914 to be transmitted or radiated to a receive section 924 to be calibrated. A PA or RF attenuator can be disposed between the output of calibration transmit section 902 and calibration antenna element 914, in some embodiments.

A signal pathway 920 denotes the propagation of the RF signal to receive section 924. The RF signal is received by receive section 924 via an antenna element 922 electrically coupled thereto. Receive section 924 includes a RF section 926 and a baseband section 940. RF section 926 includes a LNA 928, mixer 930, LPF 932, an ADC 934, and an Rx DFE 936. Mixer 930, LPF 932, and ADC 934 are similar to respective mixer 138, LPF 140, and ADC 142. Rx DFE 936 is configured to perform processing to ready the signal for handoff to baseband section 940. RF section 926 is configured to process the received RF signal including down converting to remove the carrier frequency, filtering, converting to a digital signal, perform amplification, and/or the like. The output of RF section 926 comprises the received reference signal including potential gain and/or delay offsets introduced by antenna element 922 and/or receive section 924. The output of RF section 926 is referred to as the received reference signal.

The output of RF section 926 can be provided to calibration transmit section 902 via signal pathway 956. For regular signals that are received by receive section 924, after processing by RF section 926, such signal continues into baseband section 940 to undergo decoding by phase shifter(s) 942 and time delay filter(s) 944 to reconstitute or recover the regular signal. For the received reference signal, such signal need not be provided to baseband section 940, as decoding is not necessary.

A reference signal transmitted by calibration transmit section 902 (an analog RF signal) propagates over-the-air (see signal pathway 960) to be received by antenna element 962 electrically coupled to receive section 964. Receive section 964 is similar to receive section 924. Receive section 964 includes a RF section 966 and a baseband section 980. RF section 966 includes LNA 968, mixer 970, LPF 972, ADC 974, and Rx DFE 976 similar to respective LNA 928, mixer 930, LPF 932, ADC 934, and Rx DFE 936 of receive section 924. Baseband section 980 includes phase shifter(s) 982 and time delay filter(s) 984 similar to respective phase shifter(s) 942 and time delay filter(s) 944 of receive section 924.

The output of RF section 966 comprises the received reference signal including potential gain and/or delay offsets introduced by antenna element 962 and/or receive section 964. The output of RF section 966 is referred to as the received reference signal. Such output of RF section 966 is provided to calibration transmit section 902 via signal pathway 958. Signal pathways 956, 958 comprise wired connections (e.g., conductive traces) between section 902 and respective sections 924, 964.

In some embodiments, over-the-air calibration of receive sections is performed sequentially by calibration transmit section 902. A reference signal is transmitted at a time t1 by calibration transmit section 902 to be received by receive section 924. A reference signal is transmitted at a time t2, that is earlier or later than time t1, by calibration transmit section 902 to be received by receive section 964. The reference signals transmitted at times t1 and t2 can be the same or different from each other. For example, both reference signals can be the first reference signal, both reference signals can be the second reference signal, the reference signal at time t1 can be the first reference signal and the reference signal at time t2 can be the second reference signal, the reference signal at time t1 can be the second reference signal and the reference signal at time t2 can be the first reference signal, and/or the like.

In other embodiments, a single transmission of a reference signal by calibration transmit section 902 can be received by more than one receive section, such as both of receive sections 924 and 964. Each of receive sections 924, 964 performs RF processing on its received RF signal and provides the output of its RF section (e.g., its received reference signal) to calibration transmit section 902.

Although calibration of two receive sections are discussed herein in connection with FIG. 9, it is understood that fewer or more than two receive sections can be calibrated by calibration transmit section 902.

The received reference signal provided by receive section 924 is correlated against the (originating) reference signal by correlator 916. The correlation is used by LMS engine 918 to determine gain and delay values appropriate to calibrate receive section 924, including one or more iterations of estimated gain and delay values, as discussed herein in connection with transmit section calibration. Likewise, the received reference signal provided by receive section 964 is correlated against the (originating) reference signal by correlator 916. LMS engine 918 is configured to determine gain and delay values with which to calibrate receive section 964.

A LNA can be disposed between antenna element 922 and receive section 924, in some embodiments. A LNA can also be disposed between antenna element 962 and receive section 964. Antenna elements 914, 922, and 962 comprise part of a phased array antenna, such as inclusion in the antenna lattice 500.

In some embodiments, calibration transmit section 902 and the plurality of receive sections to be calibrated (e.g., receive sections 924, 964) are included in the same IC chip or package or otherwise has a wired connection between each pair of a receive section to be calibrated and the correlator/LMS engine associated with the calibration transmit section 902.

In some embodiments, a baseband section is optional in the calibration transmit section 902. In some embodiments, the receive sections (e.g., receive sections 924, 964) include digital beamformers (DBFs) in the baseband sections (e.g., baseband sections 940, 980) and correspondingly are configured to perform reverse digital beamforming of received signals provided by respective RF sections (e.g., RF sections 926, 966) in order to recover the original data transmitted in the signals.

Figure 10:
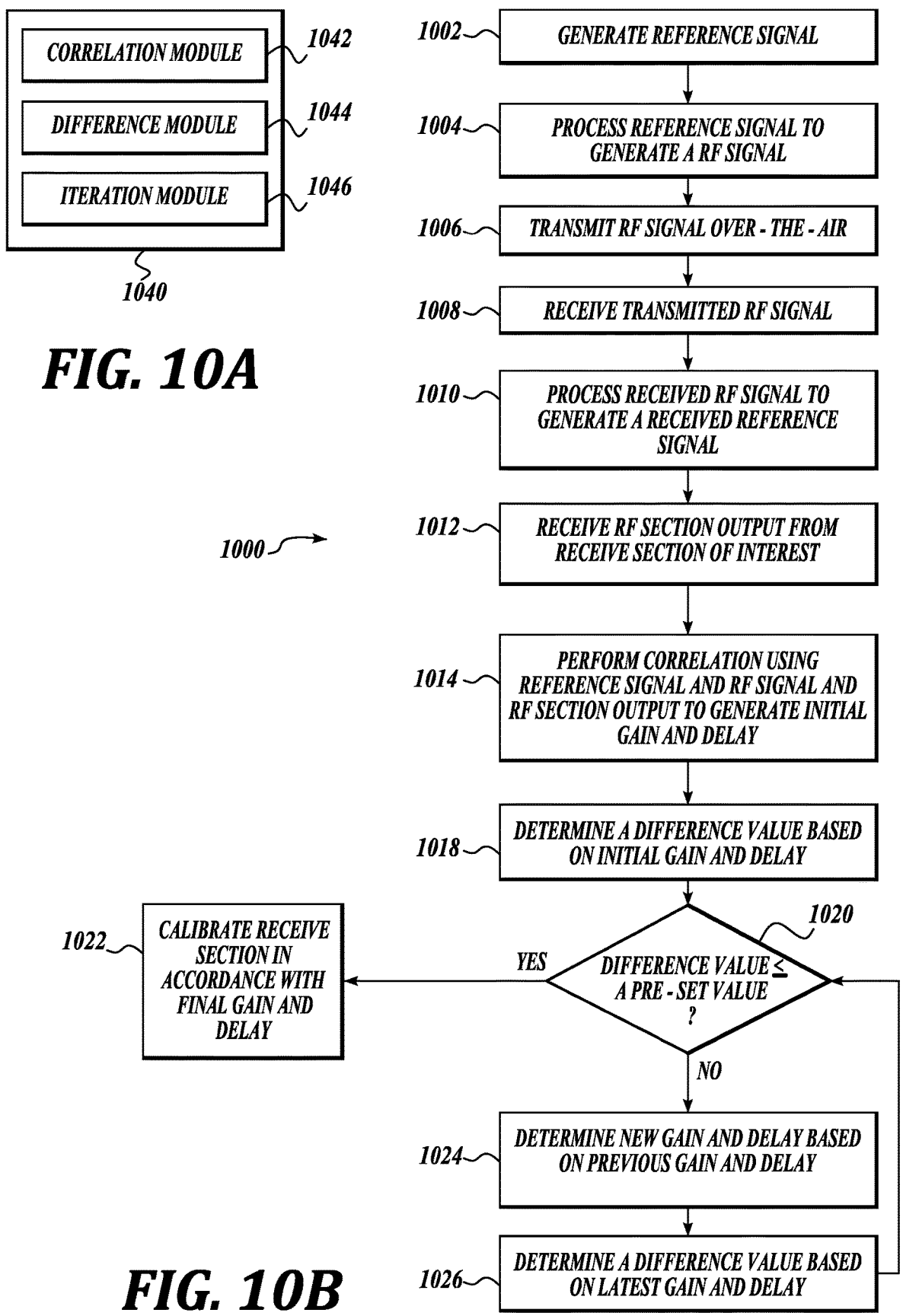
FIG. 10A illustrates a block diagram showing example modules of correlator(s) and LMS engine configured to perform an over-the-air calibration technique in accordance with various aspects of the present disclosure.
FIG. 10B illustrates a flow diagram showing a process to calibrate a receive section and associated antenna element using the over-the-air calibration technique in accordance with various aspects of the present disclosure.

FIG. 10A illustrates a block diagram showing example modules of correlator(s) and LMS engine configured to perform an over-the-air calibration technique in accordance with various aspects of the present disclosure. A correlation module 1042, a difference module 1044, and an iteration module 1046 are configured to perform computations and processing associated with performance of over-the-air calibration of receive sections. Correlation module 1042 can be included in correlator 916, and difference module 1044 and iteration module 1046 can be included in LMS engine 918. Correlation module 1042, difference module 1044, and iteration module 1046 performs functions similar to respective correlation module 642, difference module 644, and iteration module 646.

A calibration component 1040 associated with a calibration transmit section includes modules 1042-1046. Consistent with the various possible implementations of the correlators and LMS engine, calibration component 1040 can be located within or external to calibration transmit section. Calibration component 1040 is also referred to as a calibration section.

In some embodiments, one or more of modules 1042-1046 (or a portion thereof) comprises one or more instructions embodied within a tangible or non-transitory machine (e.g., computer) readable storage medium, which when executed by a machine causes the machine to perform the operations described herein. Modules 1042-1046 (or a portion thereof) may be stored local or remote from the calibration receive section. One or more processors included in component 1040 can be configured to execute modules 1042-1046 (or a portion thereof). In alternative embodiments, one or more of modules 1042-1046 (or a portion thereof) may be implemented as firmware or hardware such as, but not limited to, an application specific integrated circuit (ASIC), programmable array logic (PAL), field programmable gate array (FPGA), and/or the like. In other embodiments, one or more of modules 1042-1046 (or a portion thereof) may be implemented as software while other of the modules 1042-1046 (or a portion thereof) may be implemented as firmware and/or hardware.

FIG. 10B illustrates a flow diagram showing a process 1000 to calibrate a receive section and associated antenna element using the over-the-air calibration technique in accordance with various aspects of the present disclosure. At a block 1002, a waveform generator (e.g. waveform generator 901) is configured to generate a reference signal. Block 1002 is similar to block 602.

The generated reference signal is provided to a calibration transmit section (e.g., calibration transmit section 902) to be converted into a RF signal for transmission, at a block 1004.

Next, at a block 1006, the RF signal is transmitted over-the-air by the calibration transmit section. The transmission is received by a receive section to be calibrated (the receive section of interest) (e.g., receive section 924), at a block 1008.

The RF section of the receive section of interest processes the received RF signal to generate a received reference signal, at a block 1010. The received reference signal comprises the RF section output. The RF section output is provided to the calibration transmit section via a wired connection, at a block 1012.

Next, at a block 1014, correlation module 1042 is configured to perform correlations based on the reference signal and the RF section output that is the received reference signal. The correlations are used to generate initial estimated gain and delay. Block 1014 is similar to block 616 except the correlation module 1042 associated with the calibration transmit section performs the determination.

Blocks 1016, 1018, 1020, 1024, and 1026 are similar to respective blocks 616, 618, 620, 624, and 626 except the difference module 1044 and iteration module 1046 associated with the calibration transmit section are used instead of difference module 644 and iteration module 646. At a block 1022, the receive section of interest is calibrated in accordance with the final gain and delay estimates.

Figure 7B:
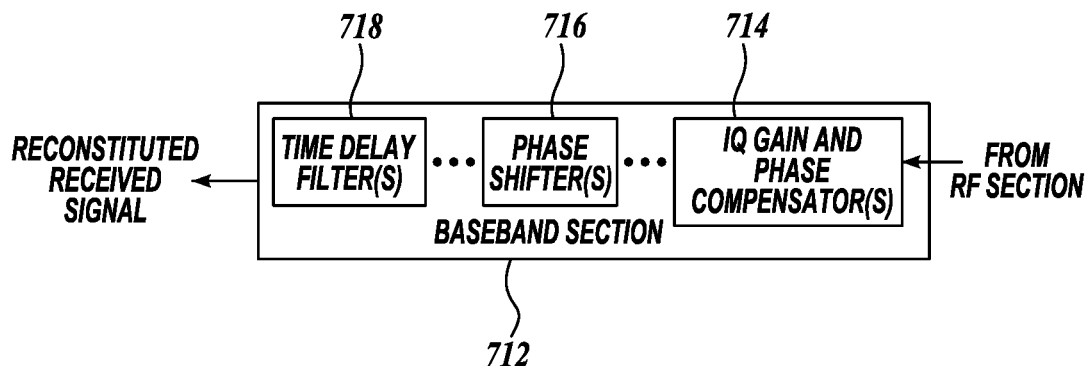
FIG. 7B illustrates an example block diagram showing gain and delay compensator(s) included in a receive section of interest in accordance with various aspects of the present disclosure.

FIG. 7B illustrates an example block diagram showing gain and delay compensator(s) included in a receive section of interest in accordance with various aspects of the present disclosure. In some embodiments, a baseband section 712 of the receive section of interest includes, without limitation, IQ gain and phase compensator(s) 714, phase shifter(s) 716, and time delay filter(s) 718. Each of IQ gain and phase compensator(s) 714, phase shifter(s) 716, and time delay filter(s) 718 can comprise one or more electrical components.

IQ gain and phase compensator(s) 714 are set in accordance with the final gain and RF delay (phase) values determined in process 1000, at block 1022. Time delay filter(s) 718 are set in accordance with the final baseband delay value determined in process 1000. Time delay filter(s) 718 comprise baseband delay compensators. IQ gain and phase compensator(s) 714 are also referred to as IQ gain and RF delay compensators. In some embodiments, additional gain and RF delay compensators and/or baseband delay compensators may be included in the receive section of interest, such as, within the RF section.

The RF section of the receive section of interest can comprise a quadrature direct conversion transmitter (IQ) section, a quadrature direct conversion transmitter, or the like. The components within the RF section can define two parallel signal paths, a first set of components configured to process the I portion of a complex-valued signal and the second set of components configured to process the Q portion of the complex-valued signal. The IQ gain and phase compensator(s) 714 are appropriately configured to receive I and Q portions of the complex-valued signal from the RF section, and then apply compensation to cancel out the gain and/or delay offset present in the I and Q portions of the complex-valued signal. Such compensated I and Q portions of the complex-valued signal is then be decoded by phase shifter(s) 716 and time delay filter(s) 718 to reconstitute the original data transmitted. Absent the gain and delay offset compensation, the decoding performed by phase shifter(s) 716 and time delay filter(s) 718 may not yield reconstitution of the original data transmitted.

Over-the-air calibration of antenna elements and associated circuitry such as, but not limited to, transmit sections and receive sections (or portions thereof) configured to perform baseband and RF processing of signals to be transmitted and received may occur at initial system configuration, at system start up, periodically, continuously, on demand during normal operation of the system, based on a trigger event (e.g., temperature change above a threshold, operational life above a threshold, signal quality below a threshold, etc.), and/or the like. Over-the-air calibration of a transmit section facilitates pre-compensation of the signal to be transmitted by that transmit section. Over-the-air calibration of a receive section facilitates post-compensation of a signal received by that receive section. In this manner, even a large number of antenna elements and associated transmission or receive circuitry can be calibrated and remain calibrated over time.

In some embodiments, the transmit sections, receive sections, calibration transmit sections, calibration receive sections, associated antenna elements, and waveform generators can be included in a communications system, a wireless communications system, a satellite-based communications system, a terrestrial-based communications system, a non-geostationary (NGO) satellite communications system, a low Earth orbit (LEO) satellite communications system, one or more communication nodes of a communications system (e.g., satellites, user terminals associated with user devices, gateways, repeaters, base stations, etc.), and/or the like.

Figure 11:
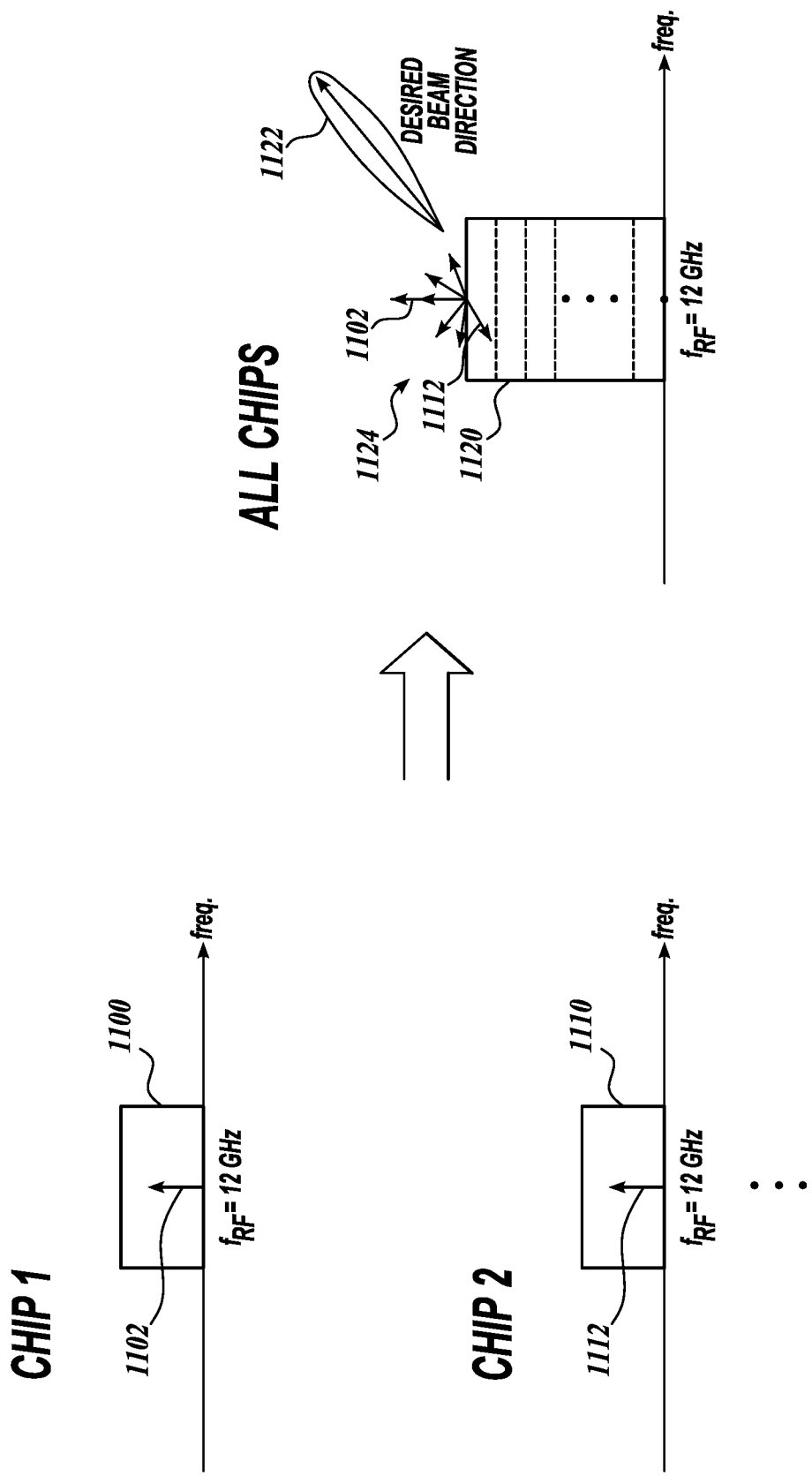
FIG. 11 illustrates local oscillator (LO) leakage impact on a signal transmission in accordance with various aspects of the present disclosure.

FIG. 11 illustrates local oscillator (LO) leakage impact on a signal transmission in accordance with various aspects of the present disclosure. If a plurality of transmit sections included in chip 1 simultaneously transmits RF signals, in which each transmit section of the plurality of transmit sections is electrically coupled to a respective antenna element of a phased array antenna, the collective RF signal transmission from chip 1 can be represented by a modulated signal 1100 having a particular bandwidth and transmitted on a carrier frequency $f_{RF}$. The carrier frequency fig can be, for example, 12 GHz. The carrier frequency is the same frequency as the LO signal frequency provided to the transmit section for up conversion or modulation. The modulated signal 1100 comprises the data or wanted signal to be transmitted.

Also transmitted with the modulated signal 1100 is a LO leakage signal 1102 transmitted at the carrier frequency. The LO leakage signal 1102 comprises an undesirable signal component that is associated with the LO signal used to up convert the data/wanted signal to the carrier frequency to form the modulated signal 1100. LO leakage signal 1102 comprises a single or narrow frequency signal or waveform at the carrier frequency. LO leakage signal 1102 is also referred to as LO leak through, LO leakage, LO feed through, a CW tone, and/or the like.

Chip 2 is similar to chip 1 except the transmit sections included in chip 2 are electrically coupled to different antenna elements of the phased array antenna from those associated with chip 1. The collective RF signal transmission from chip 2 can be represented by a modulated signal 1110 and a LO leakage signal 1112. Modulated signal 1110 and LO leakage signal 1112 are similar to respective modulated signal 1100 and LO leakage signal 1102.

Each of the remaining chips of the plurality of chips has similar transmission signal components.

The collective transmission from all of the chips is depicted on the right, in which a modulated signal 1120 transmitted at the carrier frequency $f_{RF}$ has a particular desired beam direction 1122. Modulated signal 1120 comprises the combination of modulated signal 1100, modulated signal 1110, and so forth for all of the chips. Each of the modulated signals comprising modulated signal 1120 was digitally beamformed by its respective transmit sections to be in phase with each other so as to achieve the particular beam direction 1122.

In contrast, LO leakage signals from all of the chips also transmitted at the carrier frequency flu are not digitally beamformed to be in phase with each other. Accordingly, the LO leakage signals from all of the chips have random phases that can be different from each other. The result is the LO leakage signals from all of the chips radiating in many different directions, often different from the particular desired beam direction 1122, and potentially additive to each other if they have the same phase. Different LO leakage directions 1124 include LO leakage 1102 radiating in a different direction from LO leakage 1112. Depending on characteristics of the different LO leakage directions 1124 (e.g., power, particular directions, etc.), such undesirable radiations can violate government or agency requirements for wireless transmissions.

Figure 12:
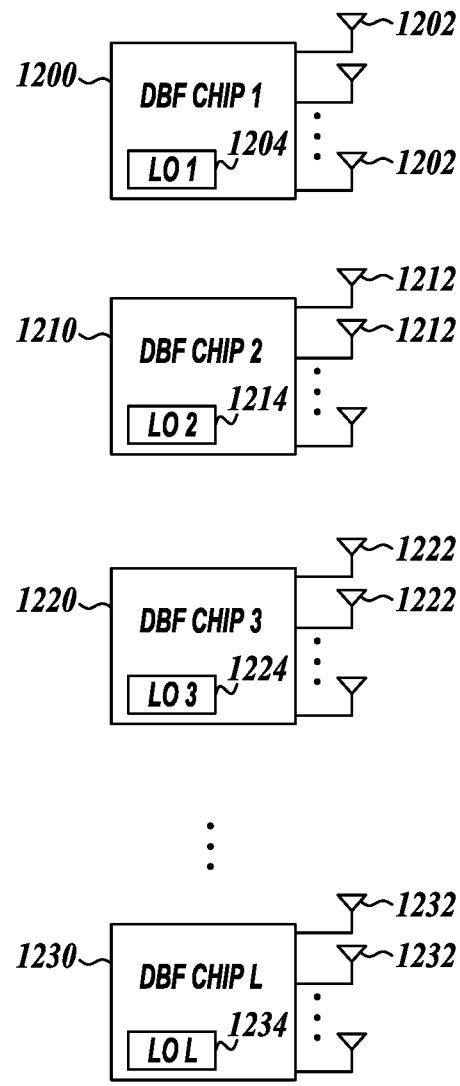
FIG. 12 illustrates a block diagram showing an example of a plurality of digital beamformer (DBF) chips configured to apply near zero intermediate frequency (NZIF) compensation to reduce or spread LO leakage signal radiative contribution in term of spectrum content measured across a certain bandwidth to a transmission beam in accordance with various aspects of the present disclosure.

In some embodiments, such undesirable contribution of the LO leakage signals to the overall transmission or beam transmitted by the plurality of DBF chips is reduced or prevented using a near zero intermediate frequency (NZIF) compensation technique disclosed herein. FIG. 12 illustrates a block diagram showing an example of a plurality of DBF chips configured to apply NZIF compensation to reduce LO leakage signal radiative contribution to a transmission beam in accordance with various aspects of the present disclosure. The plurality of DBF chips includes a DBF chip 1200 (denoted as DBF chip 1) electrically coupled to a plurality of antenna elements 1202, a DBF chip 1210 (denoted as DBF chip 2) electrically coupled to a plurality of antenna elements 1212, a DBF chip 1220 (denoted as DBF chip 3) electrically coupled to a plurality of antenna elements 1222, and so forth, to a last DBF chip 1230 (denoted as DBF chip L) electrically coupled to a plurality of antenna elements 1232. The antenna elements 1202, 1212, 1222, and 1232 comprise antenna elements of a phased array antenna.

Each of the DBF chips 1200, 1210, 1220, and 1230 includes a plurality of transmit sections, one transmit section for each antenna element associated with the DBF chip. DBF chips 1200, 1210, 1220, and 1230 also includes respective LOs 1204, 1214, 1224, and 1234. LO 1204 (denoted as LO 1) generates and provides a LO signal at a frequency $f_{LO1}$. LO 1214 (denoted as LO 2) generates and provides a LO signal at a frequency $f_{LO2}$. LO 1224 (denoted as LO 3) generates and provides a LO signal at a frequency $f_{LO3}$. LO 1234 (denoted as LO L) generates and provides a LO signal at a frequency $f_{LOL}$. As will be described in detail below, the frequencies of LOs 1204, 1214, 1224, and 1234 are configured to be different from each other in accordance with the NZIF technique disclosed herein.

Figure 13:
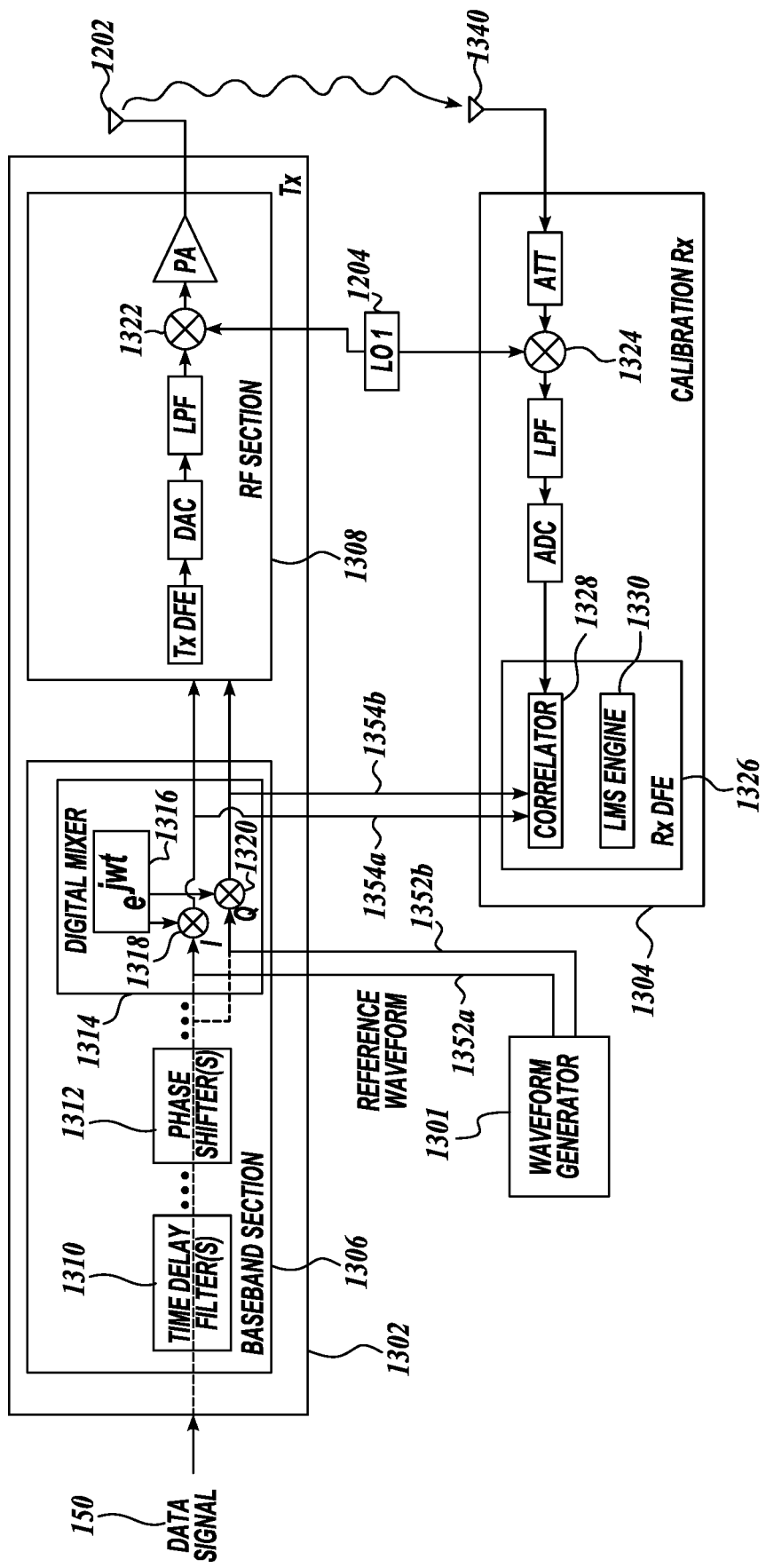
FIG. 13 illustrates a block diagram showing an example of a transmit section of the plurality of transmit sections, based on a digital frequency rotation, included in a DBF chip in accordance with various aspects of the present disclosure.

FIG. 13 illustrates a block diagram showing an example of a transmit section 1302 of the plurality of transmit sections included in the DBF chip 1200 in accordance with various aspects of the present disclosure. Transmit section 1302 is also representative of transmit sections included in any of DBF chips 1210, 1220, and/or 1230.

Transmit section 1302 comprises a digital beamforming transmitter. In analog beamforming, the same input signal is provided to each antenna element of a phased array antenna, via one or more analog beamforming transmitters disposed between the input signal and the antenna elements, except the input signal to respective antenna elements is phase shifted relative to each other. The analog beamforming transmitter(s) includes analog phase shifter(s) set to a particular phase for each antenna element different from the other antenna elements (e.g., analog phase shifter 1 of antenna element 1 set to phase of 10 degrees, analog phase shifter 2 of antenna element 2 set to phase of 20 degrees, etc.). The different phases among the analog phase shifters configure the signals radiated by the respective antenna elements such that the combination of those signals is a desired overall signal emitted by the phased array antenna.

In contrast, in digital beamforming, different input signals are configured in the digital domain for the antenna elements of the phased array antenna. For example, the signals provided to respective antenna elements can differ from each other in one or more of, without limit, phase, time delay, gain, power, frequency band (e.g., subcarriers), and/or the like. The greater flexibility in signal configuration between antenna elements facilitates spatial multiplexing, in which a superposition of signals are transmitted, each signal with a separate directivity. In some embodiments, the transmit sections, receive sections, calibration transmit sections, and/or calibration receive sections disclosed herein comprise digital beamforming components. In some embodiments, over-the-air calibration and/or NZIF compensation techniques disclosed herein are applicable to communication systems employing digital beamforming.

In some embodiments, transmit section 1302 includes a baseband section 1306 and a RF section 1308. The baseband section 1306 includes, without limitation, time delay filter(s) 1310, phase shifter(s) 1312, and a digital mixer 1314. The time delay filter(s) 1310 and phase shifter(s) 1312 are configured to perform digital beamforming on a signal inputted to the baseband section 1306 (e.g., data signal or reference waveform 1352a, 1352b). The digital mixer 1314 is configured to change the baseband frequency of the inputted signal. The time delay filter(s) 1310 and phase shifter(s) 1312 are similar to respective time delay filter 108 and phase shifter 110. The number of each of the time delay filter(s) 1310 and phase shifter(s) 1312 can be a function of the number of signal paths included in baseband section 1306. The RF section 1308 is similar to RF section 112.

Digital mixer 1314 includes a NZIF frequency shifter 1316, an I component mixer 1318, and a Q component mixer 1320. Digital mixer 1314 is also referred to as a digital frequency rotator or NZIF generator. The signal inputted to digital mixer 1314 comprises I component and Q component of a complex-valued signal and has a baseband (center) frequency $f_{DC}=0$ Hz or direct current (DC). The NZIF frequency shifter 1316 is configured to generate or is set to a particular baseband frequency shift to be applied to the baseband frequency of the inputted signal so that the new baseband frequency will be greater than 0 Hz or DC (near zero but not equal to 0 Hz or DC). The particular frequency shifted baseband frequency can be denoted as $f_{DC\_NZIF}$. The particular frequency shifted baseband frequency is also referred to as an NZIF frequency. The particular baseband frequency shift is applied to each of the I and Q components of the inputted signal by I component mixer 1318 and Q component mixer 1320, respectively. NZIF frequency shifter 1316 is also referred to as a baseband frequency shift generator. As an example, the particular frequency shift can be 40 kHz and thus $f_{DC\_NZIF}=40$ kHz.

The output of each of I and Q component mixers 1318, 1320 comprises the I and Q components of the inputted signal, respectively, having a new baseband (center) frequency $f_{DC\_NZIF}$. The outputs of I and Q components mixers 1318, 1320 comprise the output of baseband section 1306. If the inputted signal is the data signal, which is the regular, wanted, or data-bearing signal to be transmitted, then such inputted signal is provided to digital mixer 1314 after digital beamforming has been applied by time delay filter(s) 1310 and phase shifter(s) 1312 (e.g., after encoding has been applied to the inputted signal). If the inputted signal is a reference or calibration signal 1352a, 1352b, then such inputted signal bypasses digital beamforming and is not encoded when inputted to digital mixer 1314.

The output of baseband section 1306 comprises the input to RF section 1308. RF section 1308 is configured to process the signal to provide to antenna element 1202 for transmission. The signal processing includes up conversion or modulation by mixer 1322 using the LO signal at a frequency $f_{LO1}$ provided by LO 1204. The output of RF section 1308 comprises a RF or modulated signal to be transmitted at a carrier frequency $f_{RF}$ that is greater than $f_{DC\_NZIF}$.

In conventional systems, the frequency of the LO signal, as applied to the up conversion mixer or modulator, equals the carrier frequency. In the present NZIF compensation scheme, the frequency $f_{LO1}$ of LO signal generated by LO 1204 is a different frequency than carrier frequency $f_{RF}$. Frequency $f_{LO1}$ is specifically set to be the desired carrier frequency $f_{111}$ minus the particular DC frequency shift $f_{DC\_NZIF}$ applied by the digital mixer 1314. Continuing the above example, if the particular DC frequency shift $f_{DC\_NZIF}=40$ kHz and the desired carrier frequency $f_{RF}=12$ GHz, then the LO frequency $f_{LO1}=12$ GHz$-40$ kHz. Then when the signal to be transmitted is up converted in accordance with the LO signal frequency $f_{LO1}$, the applied NZIF DC frequency shift will be added to the specifically set frequency $f_{LO1}$ of the LO signal to result in the actual carrier frequency being the desired carrier frequency. The actual carrier frequency is $f_{LO1}$ $f_{DC\ NZIF}$=(12 GHz-40 kHz)+40 kHz=12 GHz. DC frequency shift is also referred to as baseband frequency shift, NZIF, and/or the like.

The LO signal generation is configured so that the NZIF frequency offset is precisely compensated or accounted for in the RF domain (using precise LO signal frequency generation) before signal transmission.

Although the signal to be transmitted transmits at the desired frequency as set forth above, the LO leakage signal introduced during up conversion and now present with the signal transmits at the LO signal frequency $f_{LO1}$ (e.g., at 12 GHz-40 kHz). The signal of interest to be transmitted transmits at a different center frequency than the undesirable LO leakage signal.

The receive section that receives the transmission is configured to down convert or demodulate the received signal using a LO signal having the same frequency as LO 1204. The receive section is included in a communication node or device of a communications system different from the communication node/device including transmit section 1302.

In some embodiments, transmit section 1302 configured for NZIF compensation can be calibrated using the over-the-air calibration technique disclosed herein. In particular, a waveform generator 1301 and a calibration receive section 1304 are included in DBF chip 1200. Waveform generator 1301 and calibration receive section 1304 are similar to respective waveform generator 101 and calibration receive section 104.

Waveform generator 1301 generates a reference signal 1352 comprising an orthogonal code based signal, similar to reference waveform 152. The reference signal 1352 comprises a complex-valued orthogonal code base signal having an I component 1352a and a Q component 1352b. The I and Q components 1352a, 1352b are inputs to respective mixers 1318, 1320. Digital mixer 1314 applies the NZIF DC frequency shift to I and Q components 1352a, 1352b. The NZIF frequency shifted I and Q components comprise the output of baseband section 1306.

The NZIF frequency shifted I and Q components comprise the input to RF section 1308. RF section 1308 performs RF processing as discussed above, and then the resulting RF signal, which includes the reference signal and the undesirable LO leakage signal, are transmitted by antenna element 1202 to be received by antenna element 1340 electrically coupled to calibration receive section 1304. Antenna element 1340 can be one of the antenna elements 1202.

The NZIF frequency shifted I and Q components that are the output of the baseband section 1306 are provided, via signal pathways 1354a and 1354b, to correlator(s) 1328 included in Rx DFE 1326 of calibration receive section 1304. Rx DFE 1326 also include a LMS engine 1330. The NZIF frequency shifted I and Q components are the reference signal to be used for over-the-air calibration of transmit section 1302. The NZIF frequency shifted I and Q components comprise the feedback to calibration receive section 1304 of the injected reference signal to transmit section 1302 of interest. The reference signal 1352 from waveform generator 1301 is inadequate for correlation with the received reference signal because reference signal 1352 lacks the NZIF frequency shift present in the received reference signal.

The calibration receive section 1304 performs RF processing on the received RF signal, including performing down conversion or demodulation using the LO signal having same frequency $f_{LO1}$ from LO 1204, to generate a received reference signal. Accordingly, the down conversion symmetrically reverses the applied up conversion by transmit section 1302 of interest. Continuing the above example, if the output of baseband section 1306 has the particular DC frequency shift $f_{DC\ NZIF}$=40 kHz, then the received reference signal also has a DC frequency shift $f_{DC\ NZIF}$=40 kHz. The output of baseband section 1306 and the received reference signal are correlated by correlator 1328 to start calibration computations as set forth in process 600. Additional or separate signal processing is not required to account for the NZIF frequency shift.

Each of the transmit sections of the plurality of transmit sections included in DBF chip 1200 is similar to transmit section 1302, including the same particular DC frequency shift applied by respective digital mixers. The digital mixers included in DBF ship 1210 are set to a DC frequency shift value different from DBF chip 1200 and any of the other DBF chips. This is the case with all DBF chips of the plurality of DBF chips. For example, digital mixers of DBF chip 1200 are set to apply a DC frequency shift $f_{DC\ NZIF}$=40 kHz, digital mixers of DBF chip 1210 are set to apply a DC frequency shift $f_{DC\ NZIF}$=80 kHz, digital mixers of DBF chip 1220 are set to apply a DC frequency shift $f_{DC\ NZIF}$=120 kHz, and so forth, to digital mixers of DBF chip 1230 (the Lth DBF chip) set to apply a DC frequency shift $f_{DC\ NZIF}$=L×40 kHz.

The carrier frequency is the same in all the DBF chips. For example, $f_{RF}$=12 GHz.

The LO signal frequency of each of the DBF chips differs from each other based on the DC frequency shift value of digital mixers in the same chip. Continuing the example, the LO signal from LO 1204 has a frequency $f_{LO1}$=$f_{RF}$–DBF chip 1200 $f_{DC\ NZIF}$=12 GHz-40 kHz, the LO signal from LO 1214 has a frequency $f_{LO2}$=$f_{RF}$–DBF chip 1210 $f_{DC\ NZIF}$=12 GHz-80 kHz, the LO signal from LO 1224 has a frequency $f_{LO3}$=$f_{RF}$–DBF chip 1220 $f_{DC\ NZIF}$=12 GHz-120 kHz, and so forth, to the LO signal from LO 1234 having a frequency $f_{LOL}$=$f_{RF}$–DBF chip 1230 $f_{DC\ NZIF}$=12 GHz-(L×40 kHz).

Note that the 40 kHz frequency difference or separation in the DC frequency shift of digital mixers of respective DBF chips, and also between the LOs of the respective DBF chips, can be a value smaller or greater than 40 kHz. The DC frequency difference, separation, or spread $\Delta f_{spread}$ (also referred to as the LO frequency difference, separation, or spread) between DBF chips comprises a relatively small value so that L×$\Delta f_{spread}$ is much less than the frequency bandwidth of the modulated signal.

The different DC frequency shift $f_{DC\ NZIF}$ in the DBF chips can all be positive shifts or increases in frequency from the nominal 0 Hz or DC frequency, or all negative shifts or decreases in frequency from the nominal 0 Hz or DC frequency. The LO frequencies correspondingly reflect the positive or negative shifts so that the applied NZIF frequency shifts are additive to the LO signal frequencies, resulting in the modulated signals at the desired carrier frequency.

FIG. 14 illustrates example signals showing various applicable frequencies with NZIF compensation technique in accordance with various aspects of the present disclosure. The left side of FIG. 14 shows a transmitted signal associated with DBF chip 1200 (chip 1) at various signal path points of the transmit sections and after receipt by a receiver or calibration receive section. The right side of FIG. 14 shows a transmitted signal associated with DBF chip 1210 (chip 2) at various signal path points of the transmit sections and after receipt by a receiver or calibration receive section.

For DBF chip 1200 (chip 1), an inputted signal 1400 is initially centered at a DC frequency $f_{DC}$=0 Hz or DC, at before the digital mixer of a transmit section. After the digital mixer of the transmit section, the inputted signal 1400 is converted to a NZIF compensated signal 1402 having a DC frequency shifted by a particular amount (e.g., 40 kHz) to a new DC NZIF frequency $f_{DC\_NZIF}$=40 kHz. After processing in the RF section of the transmit section, signal 1402 is converted to a modulated signal 1404 to be transmitted at a carrier frequency $f_{RF}$=12 GHz and a LO leakage signal 1406 to be transmitted at the LO1 frequency $f_{LO1}$=12 GHz-40 kHz. Signals 1404 and 1406 received by a receive section or calibration receive section and after RF processing at the receiving side takes the form of a demodulated signal 1408 at a frequency $f_{DC\_NZIF}$=40 kHz.

For DBF chip 1210 (chip 2), an inputted signal 1410 is initially centered at a DC frequency $f_{DC}$=0 Hz or DC, at before the digital mixer of a transmit section. After the digital mixer of the transmit section, the inputted signal 1410 is converted to a NZIF compensated signal 1412 having a DC frequency shifted by a particular amount (e.g., 80 kHz) to a new DC NZIF frequency $f_{DC\_NZIF}$=80 kHz. After processing in the RF section of the transmit section, signal 1412 is converted to a modulated signal 1414 to be transmitted at a carrier frequency $f_{RF}$=12 GHz and a LO leakage signal 1416 to be transmitted at the LO2 frequency $f_{LO2}$=12 GHz-80 kHz. Signals 1414 and 1416 received by a receive section or calibration receive section and after RF processing at the receiving side takes the form of a demodulated signal 1418 at a frequency $f_{DC\_NZIF}$=80 kHz.

The digital mixers are all synchronized to start at the same time in all of the DBF chips of the plurality of DBF chips. All of the digital mixers are configured to actuate or start at a same particular counter value of a reference clock signal counter, which is included in each DBF chip and whose count values are the same in all of the DBF chips at each time point.

Figure 15:
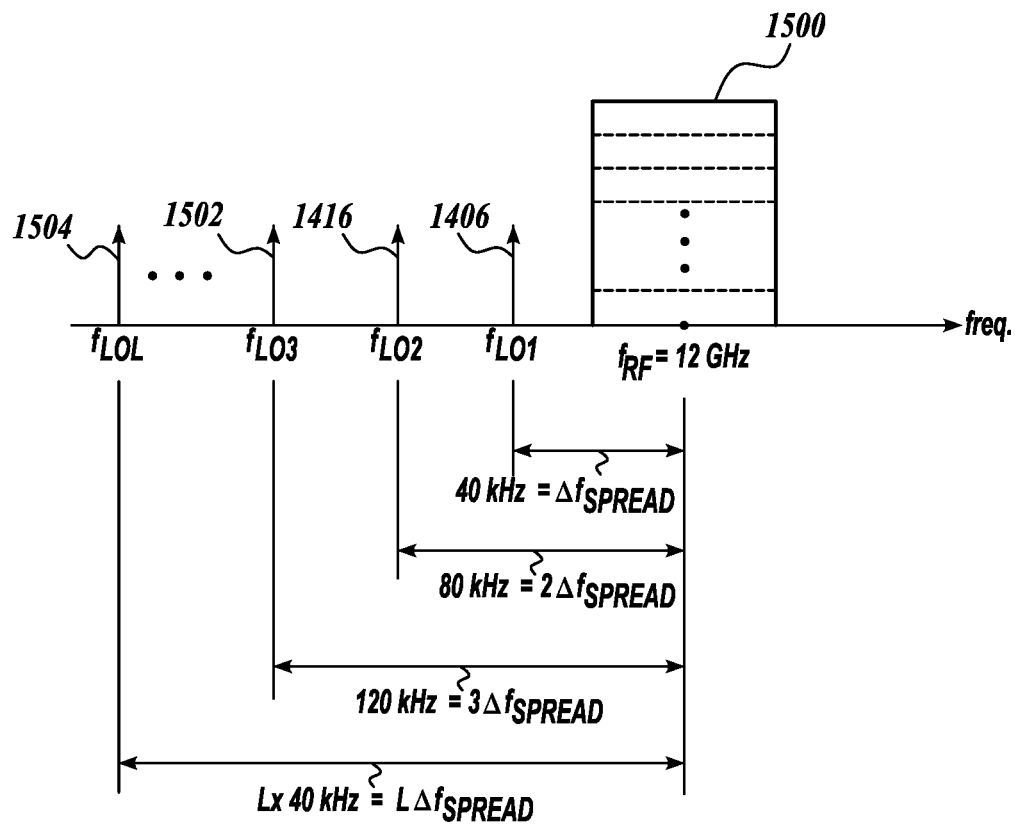
FIG. 15 illustrates the overall transmitted beam or signal from a phased array antenna from all of the DBF chips with application of the NZIF compensation technique in accordance with various aspect of the present disclosure.

FIG. 15 illustrates the overall transmitted beam or signal from all of the DBF chips with application of the NZIF compensation technique in accordance with various aspect of the present disclosure. The transmitted modulated signal and LO leakage signal from each of the DBF chips, including modulated signal 1404 and LO leakage signal 1406 from DBF chip 1200 and modulated signal 1414 and LO leakage signal 1416 from DBF chip 1210, contribute to the overall transmitted beam or signal shown in FIG. 15.

The modulated signal from each of the DBF chips superimpose or stack on each other to form modulated signal 1500 transmitting at a carrier frequency $f_{RF}$=12 GHz. LO leakage signal 1406 from DBF chip 1200 transmits at a frequency shifted or spread out from the carrier frequency by 40 kHz and also spread out from each of the other LO leakage signals by 40 kHz. LO leakage signal 1416 from DBF chip 1210 transmits at a frequency shifted or spread out from the carrier frequency by 80 kHz and also spread out from each of the other LO leakage signals by 40 kHz. LO leakage signal 1502 from DBF chip 1220 transmits at a frequency shifted or spread out from the carrier frequency by 120 kHz and also spread out from each of the other LO leakage signals by 40 kHz. LO leakage signal 1506 from DBF chip 1230 transmits at a frequency shifted or spread out from the carrier frequency by L×40 kHz and also spread out from each of the other LO leakage signals by 40 kHz.

Since the LO leakage signals from all the DBF chips are now spread out in frequency, instead of all of them transmitting at the same carrier frequency as shown in FIG. 11, even if the LO leakage signals radiate in all different direction in accordance with their random phases, the multi-directional radiation power or strength is reduced than if all radiating from the same frequency as shown in FIG. 11.

In this manner, the undesirable radiative contribution of LO leakage signals in the transmission beam can be reduced by implementation of LO leakage signal frequency spreading using NZIF. The present NZIF compensation technique is configured to cause LO leakage signal frequency spread, LO frequency spread, DC frequency spread or shift, and/or the like across transmitter chips associated with a transmission beam.

The signals and frequency separations depicted in FIGS. 11, 14, and 15 are not necessarily drawn to scale or in scale relative to each other.

Figure 16:
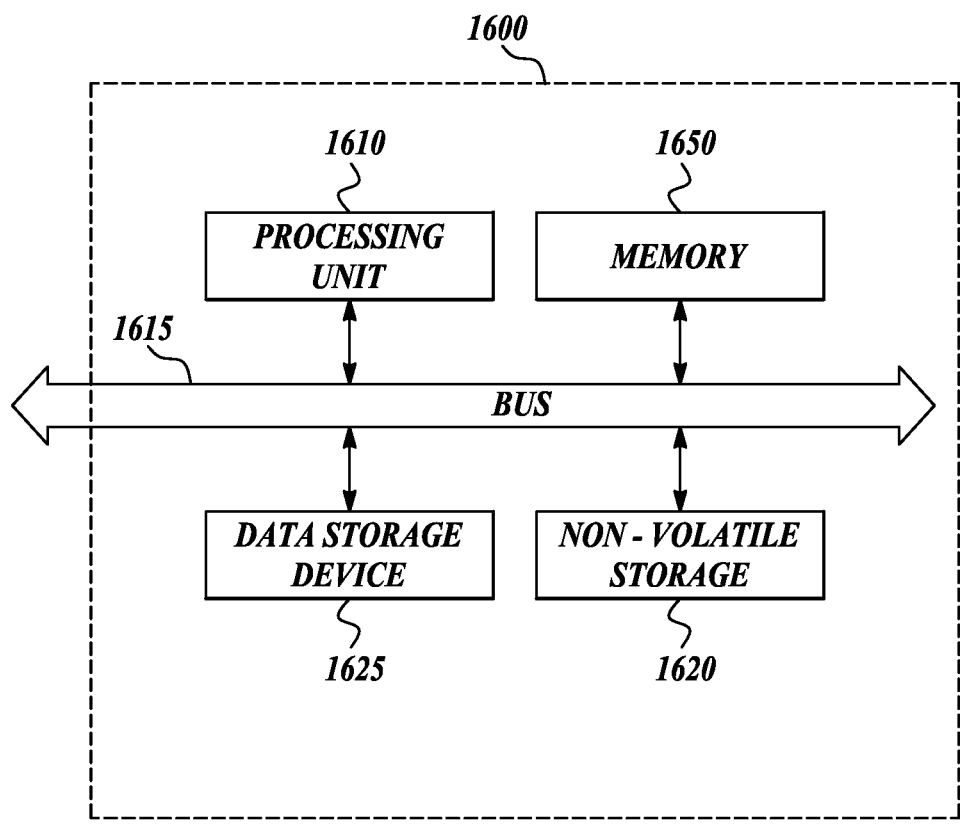
FIG. 16 illustrates a block diagram showing an example platform or device that can be implemented in at least a portion of the calibration receive sections and/or calibration transmit sections in accordance with various aspects of the present disclosure.

FIG. 16 illustrates a block diagram showing an example platform or device that can be implemented in at least a portion of the calibration receive section 104, 236, 304, 324, 404, 424, and/or 1304 and/or calibration transmit section 902 in accordance with various aspects of the present disclosure. Platform 1600 comprises at least a portion of any of correlators 146, 148, 248, 250, or 916 and/or LMS engine 160, 252, or 918. Platform 1600 as illustrated includes bus or other internal communication means 1615 for communicating information, and processor 1610 coupled to bus 1615 for processing information. The platform further comprises random access memory (RAM) or other volatile storage device 1650 (alternatively referred to herein as main memory), coupled to bus 1615 for storing information and instructions to be executed by processor 1610. Main memory 1650 also may be used for storing temporary variables or other intermediate information during execution of instructions by processor 1610. Platform 1600 also comprises read only memory (ROM), static storage, or non-volatile storage device 1620 coupled to bus 1615 for storing static information and instructions for processor 1610, and data storage device 1625 such as a magnetic disk, optical disk and its corresponding disk drive, or a portable storage device (e.g., a universal serial bus (USB) flash drive, a Secure Digital (SD) card). Data storage device 1625 is coupled to bus 1615 for storing information and instructions.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit (ASIC) or otherwise.

A tangible machine-readable storage medium includes any mechanism that provides (e.g., stores) information in a non-transitory form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

Examples of the devices, systems, and/or methods of various embodiments are provided below. An embodiment of the devices, systems, and/or methods can include any one or more, and any combination of, the examples described below.

Example 1 is a communications system including a transmitter including a digital beamforming baseband section including a digital mixer, the digital beamforming section configured to receive an input signal to be transmitted, the input signal at a baseband frequency; and a modulation section electrically coupled to the digital beamforming baseband section, the modulation section including an up converter configured to receive a local oscillator signal at a local oscillator frequency, wherein the digital mixer is configured to apply a baseband frequency shift to the input signal to generate a baseband frequency shifted input signal at a different frequency from the baseband frequency, wherein the up converter is configured to up convert the baseband frequency shifted input signal based on the local oscillator signal to generate a modulated signal at a carrier frequency, and wherein the local oscillator frequency is different from the carrier frequency.

Example 2 includes the subject matter of any of one or more of the preceding Examples, and further includes wherein a frequency of the baseband frequency shifted input signal is greater than zero hertz (Hz) or DC frequency.

Example 3 includes the subject matter of any of one or more of the preceding Examples, and further includes wherein the local oscillator frequency equals the carrier frequency minus the baseband frequency shift.

Example 4 includes the subject matter of any of one or more of the preceding Examples, and further includes wherein the modulation section is electrically coupled to an antenna of a phased array antenna, and wherein the antenna transmits the modulated signal at the carrier frequency and a local oscillator (LO) leakage signal at the local oscillator frequency.

Example 5 includes the subject matter of any of one or more of the preceding Examples, and further includes wherein the transmitter is included in a first integrated circuit (IC) chip of a plurality of IC chips, further comprising a second transmitter included in a second IC chip of the plurality of IC chips, wherein the second transmitter is electrically coupled to a second antenna of the phased array antenna, and wherein the second transmitter is configured to provide a second modulated signal at the carrier frequency and a second LO leakage signal at a second local oscillator frequency different from the local oscillator frequency to the second antenna for transmission.

Example 6 includes the subject matter of any of one or more of the preceding Examples, and further includes wherein the second modulated signal is based on a second input signal having a second baseband frequency shift different from the baseband frequency shift.

Example 7 includes the subject matter of any of one or more of the preceding Examples, and further includes wherein the second baseband frequency shift is a multiple of the baseband frequency shift.

Example 8 includes the subject matter of any of one or more of the preceding Examples, and further includes wherein the second local oscillator frequency equals the carrier frequency minus the second baseband frequency shift.

Example 9 includes the subject matter of any of one or more of the preceding Examples, and further includes wherein a baseband frequency separation between adjacent IC chips of the plurality of IC chips is equal to the baseband frequency shift, and wherein a maximum baseband frequency separation from the baseband frequency associated with an IC chip of the plurality of IC chips is less than a frequency bandwidth of the modulated signal.

Example 10 includes the subject matter of any of one or more of the preceding Examples, and further includes wherein the second transmitter includes a second digital mixer, and wherein the digital mixer and the second digital mixer actuate in synchronization with each other.

Example 11 includes the subject matter of any of one or more of the preceding Examples, and further includes wherein a frequency of the baseband frequency shifted input signal comprises a near zero intermediate frequency (NZIF).

Example 12 includes the subject matter of any of one or more of the preceding Examples, and further includes wherein the communications system comprises a satellite communication system.

Example 13 includes the subject matter of any of one or more of the preceding Examples, and further includes wherein the transmitter is included in a first device of the communications system, wherein the communications system includes a receiver included in a second device, and wherein the receiver is configured to down convert the modulated signal received using a second local oscillator signal at a second local oscillator frequency equal to the local oscillator frequency.

Example 14 includes the subject matter of any of one or more of the preceding Examples, and further includes a digital beamforming transmitter included in a communications system, the transmitter includes a digital frequency rotator configured to receive an input signal to be transmitted, the input signal at a zero hertz (Hz) or direct current (DC) frequency; and a modulation section electrically coupled to the digital frequency rotator, the modulation section including a up converter configured to receive a local oscillator signal at a local oscillator frequency, wherein the digital frequency rotator is configured to apply a baseband frequency shift to the input signal to generate a baseband frequency shifted input signal at a different frequency from the zero Hz or DC frequency, wherein the up converter is configured to up convert the baseband frequency shifted input signal based on the local oscillator signal to generate a modulated signal at a carrier frequency, and wherein the local oscillator frequency is different from the carrier frequency.

Example 15 includes the subject matter of any of one or more of the preceding Examples, and further includes wherein the input signal comprises a data signal, a regular signal, a wanted signal, or a calibration signal for over-the-air calibration of the transmitter.

Example 16 includes the subject matter of any of one or more of the preceding Examples, and further includes wherein the input signal comprises a calibration signal for over-the-air calibration of the transmitter, wherein a calibration receiver is configured to receive the baseband frequency shifted input signal as a feedback from the transmitter, and wherein the calibration receiver is configured to calibrate the transmitter based on the baseband frequency shifted input signal and the modulated signal received and down converted using a calibration local oscillator signal at a same frequency as the local oscillator frequency.

Example 17 includes the subject matter of any of one or more of the preceding Examples, and further includes wherein a frequency of the baseband frequency shifted input signal is greater than the zero Hz or DC frequency.

Example 18 includes the subject matter of any of one or more of the preceding Examples, and further includes wherein the local oscillator frequency equals the carrier frequency minus the baseband frequency shift.

Example 19 includes the subject matter of any of one or more of the preceding Examples, and further includes wherein the modulation section is electrically coupled to an antenna of a phased array antenna, and wherein the antenna transmits the modulated signal at the carrier frequency and a local oscillator (LO) leakage signal at the local oscillator frequency.

Example 20 includes the subject matter of any of one or more of the preceding Examples, and further includes wherein the transmitter is included in a first integrated circuit (IC) chip of a plurality of IC chips, wherein a second transmitter is included in a second IC chip of the plurality of IC chips, wherein the second transmitter is electrically coupled to a second antenna of the phased array antenna, and wherein the second transmitter is configured to provide a second modulated signal at the carrier frequency and a second LO leakage signal at a second local oscillator frequency different from the local oscillator frequency to the second antenna for transmission.

Example 21 includes the subject matter of any of one or more of the preceding Examples, and further includes wherein the second modulated signal is based on a second input signal having a second baseband frequency shift different from the baseband frequency shift.

Example 22 includes the subject matter of any of one or more of the preceding Examples, and further includes one or more digital beamforming components configured to encode the input signal to generate an encoded input signal, wherein the encoded input signal is provided to the digital frequency rotator to generate the baseband frequency shifted input signal.

Example 23 includes the subject matter of any of one or more of the preceding Examples, and further includes wherein the digital frequency rotator includes a baseband frequency shift generator electrically coupled to each of a first mixer associated with a complex-valued signal I component and a second mixer associated with a complex-valued signal Q component.

Example 24 includes the subject matter of any of one or more of the preceding Examples, wherein the local oscillator frequency is selected to compensate for the baseband frequency shift in the generation of the modulated signal at the carrier frequency.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

What we claim is:

1. A communications system comprising:
   a first transmitter included in a first integrated circuit (IC) chip of a plurality of IC chips including:
   a digital beamforming baseband section including a digital mixer, the digital beamforming baseband section configured to receive an input signal to be transmitted, the input signal at a baseband frequency; and
   a modulation section electrically coupled to the digital beamforming baseband section and a first antenna of a phased array antenna, the modulation section including an up converter configured to receive a local oscillator signal at a first local oscillator frequency, wherein:
   the digital mixer is configured to apply a baseband frequency shift to the input signal to generate a baseband frequency shifted input signal at a different frequency from the baseband frequency;
   the up converter is configured to up convert the baseband frequency shifted input signal based on the local oscillator signal to generate a modulated signal at a carrier frequency, and wherein the first local oscillator frequency is different from the carrier frequency; and
   the first antenna transmits the modulated signal at the carrier frequency and a local oscillator (LO) leakage signal at the first local oscillator frequency; and
   a second transmitter included in a second IC chip of the plurality of IC chips electrically coupled to a second antenna of the phased array antenna, wherein:
   the second transmitter is electrically coupled to a second antenna of the phased array antenna; and
   the second transmitter is configured to provide a second modulated signal at the carrier frequency and a second LO leakage signal at a second local oscillator frequency different from the first local oscillator frequency to the second antenna for transmission.

2. The system of claim 1, wherein a frequency of the baseband frequency shifted input signal is greater than zero hertz (Hz) or DC frequency.

3. The system of claim 1, wherein the first local oscillator frequency equals the carrier frequency minus the baseband frequency shift.

4. The system of claim 1, wherein the second modulated signal is based on a second input signal having a second baseband frequency shift different from the baseband frequency shift.

5. The system of claim 4, wherein the second baseband frequency shift is a multiple of the baseband frequency shift.

6. The system of claim 5, wherein the second local oscillator frequency equals the carrier frequency minus the second baseband frequency shift.

7. The system of claim 1, wherein a baseband frequency separation between adjacent IC chips of the plurality of IC chips is equal to the baseband frequency shift, and wherein a maximum baseband frequency separation from the baseband frequency associated with an IC chip of the plurality of IC chips is less than a frequency bandwidth of the modulated signal.

8. The system of claim 1, wherein the second transmitter includes a second digital mixer, and wherein the digital mixer and the second digital mixer actuate in synchronization with each other.

9. The system of claim 1, wherein a frequency of the baseband frequency shifted input signal comprises a near zero intermediate frequency (NZIF).

10. The system of claim 1, wherein the communications system comprises a satellite communications system.

11. The system of claim 1, wherein the first transmitter is included in a first device of the communications system, wherein the communications system includes a receiver included in a second device, and wherein the receiver is configured to down convert the modulated signal received using a second local oscillator signal at a second local oscillator frequency, wherein the second local oscillator frequency is equal to the first local oscillator frequency.

12. The system of claim 1, further comprising one or more digital beamforming components configured to encode the input signal to generate an encoded input signal, wherein the encoded input signal is provided to the digital mixer to generate the baseband frequency shifted input signal.

13. The system of claim 1, wherein the digital mixer includes a baseband frequency shift generator electrically coupled to each of a first mixer associated with a complex-valued signal I component and a second mixer associated with a complex-valued signal Q component.

14. The system of claim 1, wherein the first local oscillator frequency is selected to compensate for the baseband frequency shift in the generation of the modulated signal at the carrier frequency.

* * * * *